United States Patent
Izumiura et al.

(10) Patent No.: US 6,568,175 B2
(45) Date of Patent: May 27, 2003

(54) CONTROL SYSTEM FOR INTERNAL COMBUSTION ENGINE

(75) Inventors: Atsushi Izumiura, Wako (JP); Katsuhiro Kumagai, Wako (JP); Takashi Kiyomiya, Wako (JP); Atsushi Matsubara, Wako (JP); Shinichi Kitajima, Wako (JP); Kan Nakaune, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/024,960

(22) Filed: Dec. 19, 2001

(65) Prior Publication Data

US 2002/0095932 A1 Jul. 25, 2002

(30) Foreign Application Priority Data

Dec. 20, 2000 (JP) ........................................ 2000-386248

(51) Int. Cl.⁷ ................................................. F01N 3/00
(52) U.S. Cl. ............................. 60/284; 60/274; 60/285
(58) Field of Search ........................... 60/274, 284, 285, 60/300

(56) References Cited

U.S. PATENT DOCUMENTS

| | | | | |
|---|---|---|---|---|
| 4,175,523 A | * | 11/1979 | Noguchi et al. | 60/284 |
| 5,481,461 A | * | 1/1996 | Miyamoto et al. | 701/99 |
| 5,609,218 A | * | 3/1997 | Yamashita et al. | 180/197 |
| 5,657,625 A | * | 8/1997 | Koga et al. | 408/30 |
| 5,727,522 A | * | 3/1998 | Otani et al. | 123/339.11 |
| 5,950,419 A | * | 9/1999 | Nishimura et al. | 60/274 |
| 6,116,213 A | * | 9/2000 | Yasui et al. | 123/339.11 |
| 6,212,879 B1 | * | 4/2001 | Nishimura et al. | 60/274 |
| 6,237,327 B1 | * | 5/2001 | Nishimura et al. | 60/276 |
| 6,276,131 B1 | * | 8/2001 | Ueno et al. | 60/285 |
| 6,438,945 B1 | * | 8/2002 | Takagi et al. | 60/283 |
| 6,467,258 B1 | * | 10/2002 | Jobson et al. | 60/285 |

FOREIGN PATENT DOCUMENTS

JP 10-299631 11/1998

* cited by examiner

*Primary Examiner*—Thomas Denion
*Assistant Examiner*—Diem Tran
(74) *Attorney, Agent, or Firm*—Lahive & Cockfield, LLP

(57) ABSTRACT

A control system for an internal combustion engine having an intake system and an exhaust system is disclosed. The exhaust system includes a catalyst, and the intake system includes a throttle valve. The engine is mounted on a vehicle having a brake booster to which an intake pressure at downstream of the throttle valve is introduced. The catalyst temperature rise control in which the intake air amount is increased after starting of the engine and the ignition timing is retarded according to a rotational speed of the engine is performed. When a pressure difference between the detected intake pressure and the atmospheric pressure during the catalyst temperature raising control is less than a predetermined pressure, the increased intake air amount and the retard amount of the ignition timing is gradually decreased.

30 Claims, 16 Drawing Sheets

CONTROL SYSTEM FOR INTERNAL COMBUSTION ENGINE

BACKGROUND OF THE INVENTION

The present invention relates to a control system for an internal combustion engine for performing catalyst temperature rise acceleration control for accelerating a rise in temperature of a catalyst for exhaust gas purification at cold starting of the engine, and more particularly to such a control system for an internal combustion engine mounted on a vehicle having a brake booster to which a negative pressure (a pressure that is lower than the atmospheric pressure) in an intake system of the engine is introduced.

A catalyst for exhaust gas purification is provided in the exhaust system of an internal combustion engine. This catalyst is inactive at low temperatures. Consequently, the catalyst does not purify the exhaust gas at low temperatures. Therefore, it is desirable to rapidly raise the temperature of the catalyst, immediately after starting the engine, to activate the catalyst.

Known in the art is a technique for accelerating the rise in temperature of the catalyst. This technique increases the intake air amount immediately after starting of the engine as compared with the air intake amount at normal idling of the engine. The technique also controls the ignition timing in a retarding direction so that the rotational speed of the engine coincides with a target rotational speed (Japanese Patent Laid-open No. 10-299631). According to this technique, the fuel supply amount increases with the increase in the intake air amount. Thus, the combustion heat increases immediately after starting of the engine as compared with that at normal idling. The immediate combustion heat increase enables the acceleration of the temperature rise in the catalyst.

A brake booster is widely used for assisting the braking force for the vehicle to reduce a depression force applied to the brake pedal. A negative pressure generated in the intake pipe at a position downstream of the throttle valve of an internal combustion engine is introduced to the brake booster. The brake booster has a diaphragm to which a negative pressure corresponding to the depression amount of the brake pedal is applied to increase the braking force. Accordingly, when the negative pressure in the brake booster decreases (the absolute pressure in the brake booster increases), the assistance of the braking force by the brake booster becomes insufficient.

When performing the above-mentioned catalyst temperature rise acceleration control, the intake pressure in the intake pipe increases with an increase in the intake air amount. Accordingly, there is a possibility that the negative pressure in the intake pipe cannot be introduced to the brake booster even when the negative pressure in the brake booster is small (the absolute pressure in the brake booster is high).

SUMMARY OF THE INVENTION

It is accordingly an object of the present invention to provide a control system for an internal combustion engine which can sufficiently ensure a braking force by the brake booster when performing the catalyst temperature rise acceleration control.

The present invention provides a control system for an internal combustion engine having an intake system and an exhaust system. The exhaust system includes a catalyst, and the intake system includes a throttle valve. The engine is mounted on a vehicle having a brake booster to which an intake pressure at downstream of the throttle valve is introduced. The control system includes intake air amount control means, ignition timing control means, catalyst temperature raising means, intake pressure detecting means, and catalyst temperature rise control suppressing means. The intake air amount control means controls an intake air amount of the engine. The ignition timing control means controls an ignition timing of the engine. The catalyst temperature raising means increases the intake air amount after starting of the engine and retards the ignition timing according to a rotational speed of the engine. The intake pressure detecting means detects the intake pressure at downstream of the throttle valve. The catalyst temperature rise control suppressing means gradually suppresses the operation of the catalyst temperature raising means when a pressure difference between the detected intake pressure and the atmospheric pressure during the operation of the catalyst temperature raising means is less than a predetermined pressure.

With this configuration, when the pressure difference between the intake pressure at downstream of the throttle valve and the atmospheric pressure is less than the predetermined pressure during the operation of the catalyst temperature raising means, the operation of the catalyst temperature raising means is gradually suppressed, so that the intake pressure decreases. Accordingly, when a pressure in the brake booster is high, the pressure in the brake booster can be made to decrease (the negative pressure in the brake booster can be made to increase), thereby sufficiently ensuring a braking force by the brake booster.

Preferably, the catalyst temperature rise control suppressing means gradually decreases the increased intake air amount and gradually decreases the retard amount of the ignition timing.

Preferably, the catalyst temperature raising means operates when the rotational speed of the engine is greater than or equal to a predetermined lower limit and the engine is in an idling condition.

Preferably, the control system further includes coolant temperature detecting means for detecting a coolant temperature of the engine. An operating time period of the catalyst temperature raising means is set according to the coolant temperature detected at starting of the engine.

Preferably, the catalyst temperature raising means sets the retard amount of the ignition timing so that the rotational speed of the engine becomes equal to a target rotational speed.

The present invention provides another control system that includes the intake air amount control means, the ignition timing control means, the catalyst temperature raising means, and the catalyst temperature rise control suppressing means. This control system further includes brake booster pressure detecting means instead of the intake pressure detecting means. According to this control system, the catalyst temperature rise control suppressing means gradually suppresses the operation of the catalyst temperature raising means when a pressure difference between the detected brake booster pressure and the atmospheric pressure during the operation of the catalyst temperature raising means is less than a predetermined pressure.

With this configuration, when the pressure difference between the brake booster pressure and the atmospheric pressure is less than the predetermined pressure during the operation of the catalyst temperature raising means, the operation of the catalyst temperature raising means is gradually suppressed, so that the intake pressure decreases. Accordingly, the brake booster pressure can be made to decrease, thereby sufficiently ensuring a braking force by the brake booster.

DETAILED DESCRIPTION OF THE PREFERRED EMBODIMENTS

A preferred embodiment of the present invention will now be described with reference to the drawings.

Figure 1:
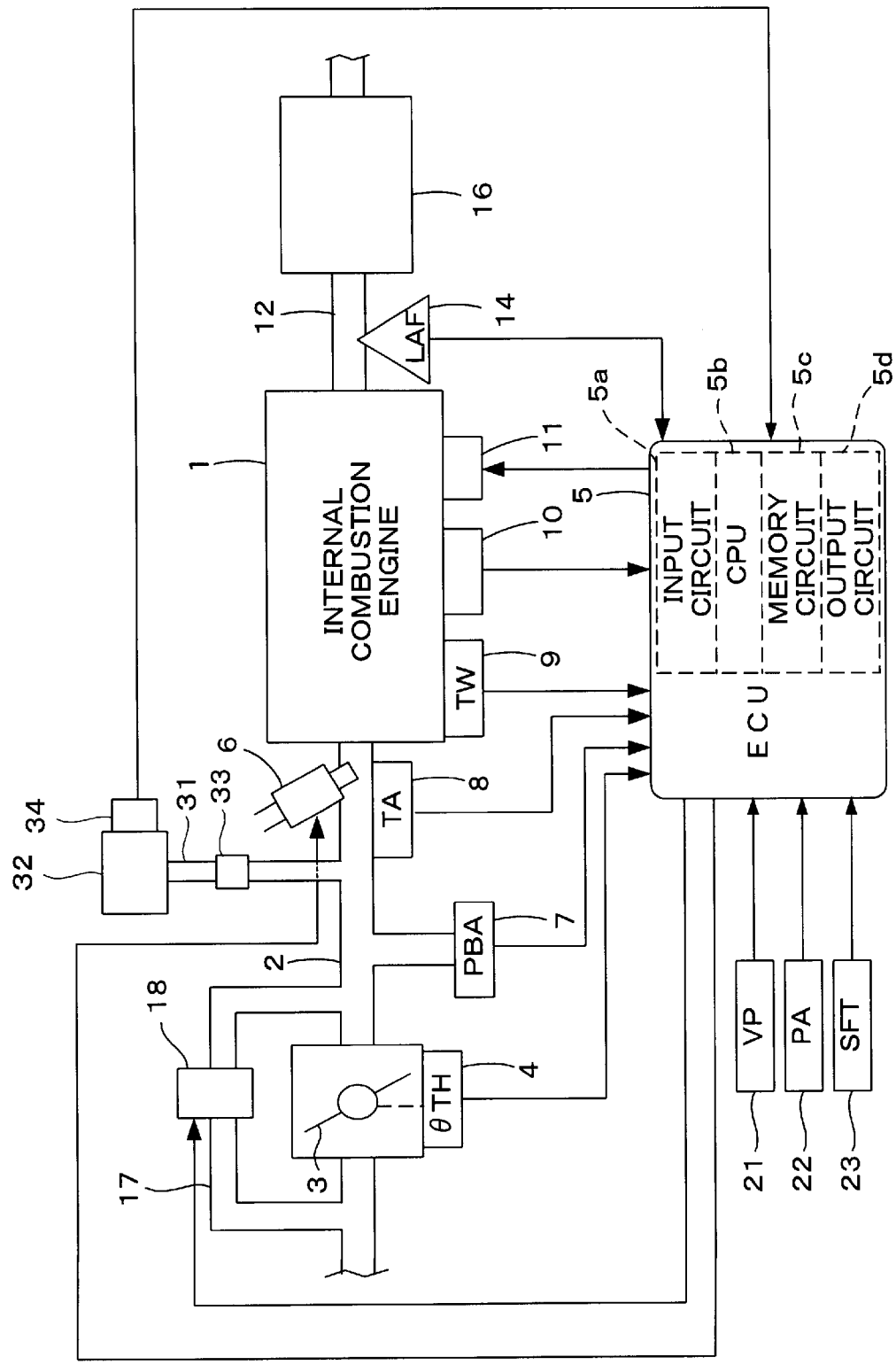
FIG. 1 is a schematic diagram showing the configuration of an internal combustion engine and a control system therefor according to a preferred embodiment of the present invention.

Referring to FIG. 1, there is schematically shown a general configuration of an internal combustion engine (which will be hereinafter referred to as "engine") and a control system therefor according to a preferred embodiment of the present invention. The engine is a four-cylinder engine 1, for example, and it has an intake pipe 2 provided with a throttle valve 3. A throttle valve opening (THA) sensor 4 is connected to the throttle valve 3, so as to output an electrical signal corresponding to an opening of the throttle valve 3 and supply the electrical signal to an electronic control unit (which will be hereinafter referred to as "ECU") 5. Those skilled in the art will recognize that the embodiments detailed herein are equally applicable to an internal combustion engine having more than four cylinders.

An auxiliary air passage 17 bypassing the throttle valve 3 is connected to the intake pipe 2. The auxiliary air passage 17 is provided with an auxiliary air control valve 18 for controlling an auxiliary air amount. The auxiliary air control valve 18 is connected to the ECU 5, and its valve opening amount is controlled by the ECU 5.

A brake booster 32 is connected via a passage 31 to the intake pipe 2 at a position downstream of the throttle valve 3, so that a negative pressure in the intake pipe 2 is introduced through the passage 31 into a negative pressure chamber of the brake booster 32. The brake booster 32 is configured so that a negative pressure corresponding to the depression amount of a brake pedal (not shown) is applied to a diaphragm to increase a braking force. A check valve 33 is provided in the passage 31. When the pressure in the negative pressure chamber of the brake booster 32 is higher than the intake pressure, the check valve 33 opens. The brake booster 32 is provided with a brake booster pressure sensor 34 as the brake booster pressure detecting means for detecting the pressure in the negative pressure chamber (which pressure will be hereinafter referred to as "brake booster pressure") PBB, and a detection signal from the brake booster pressure sensor 34 is supplied to the ECU 5.

A fuel injection valve 6 is provided for each cylinder so as to inject fuel into the intake pipe 2. Thus, four fuel injection valves 6 would be respectively provided for a four cylinder engine. The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) by a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

Each cylinder of the engine 1 is provided with a spark plug 11. The spark plug 11 is connected to the ECU 5, and a drive signal for the spark plug 11, i.e., an ignition signal, is supplied from the ECU 5 to the spark plug 11.

An exhaust pipe 12 of the engine 1 is provided with a three-way catalyst 16 for removing components such as HC, CO, and NOx in exhaust gases. A proportional type air-fuel ratio sensor (which will be hereinafter referred to as "LAF sensor") 14 is mounted on the exhaust pipe 12 at a position upstream of the three-way catalyst 16. The LAF sensor 14 outputs a detection signal substantially proportional to the oxygen concentration (air-fuel ratio) in the exhaust gases, and supplies the detection signal to the ECU 5.

A vehicle speed sensor 21 for detecting a running speed (vehicle speed) VP of a vehicle driven by the engine 1 is connected to the ECU 5. An atmospheric pressure sensor 22 for detecting an atmospheric pressure PA is also connected to the ECU 5. A shift position sensor 23 for detecting a shift position of an automatic transmission in the vehicle is also connected to the ECU 5. Detection signals output from these sensors 21, 22, and 23 are supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values. ECU 5 also includes a central process unit (which will be hereinafter referred to as "CPU") 5b and a memory circuit 5c. The memory circuit 5c preliminarily stores various operational processs to be executed by the CPU 5b and stores the results of computation or the like made by the CPU 5b. Additionally, ECU5 includes an output circuit 5d for supplying drive signals to the fuel injection valves 6, the spark plugs 11, etc.

The CPU 5b determines various engine operating conditions according to various engine parameter signals as mentioned above, and calculates a fuel injection period TOUT for each fuel injection valve 6 to be opened in synchronism with the TDC signal pulse, in accordance with Eq. (1) and according to the above determined engine operating conditions.

$$TOUT = TI \times KCMD \times KLAF \times K1 + K2 \qquad (1)$$

TI is a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA.

KCMD is a target air-fuel ratio coefficient, which is set according to engine operational parameters such as the engine rotational speed NE, the absolute intake pressure PBA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, so KCMD is also referred to as a target equivalent ratio.

KLAF is an air-fuel ratio correction coefficient calculated by PID (proportional integral differential) control so that a detected equivalent ratio KACT calculated from a detected value output from the LAF sensor 14 becomes equal to the target equivalent ratio KCMD.

K1 is another correction coefficient, and K2 is a correction variable computed according to various engine parameter signals. The correction coefficient K1 and the correction variable K2 are set to such values as to optimize various characteristics such as the fuel consumption characteristics and the engine acceleration characteristics according to engine operating conditions.

The CPU 5b further calculates an ignition timing IGLOG in accordance with Eq. (2).

$$IGLOG = IGMAP + IGCR + IGFPI \qquad (2)$$

IGMAP is a basic value of the ignition timing obtained by retrieving an IG map set according to the engine rotational speed NE and the absolute intake pressure PBA. The ignition timing is indicated by an advance amount from a top dead center.

IGFPI is a retard correction term set to a negative value so that the engine rotational speed NE becomes equal to a target rotational speed NEFIR in executing rapid warm-up retard control during warming up of the engine 1.

IGCR is a correction term other than the retard correction term IGFPI. (IGMAP+IGCR) corresponds to an ignition timing in the case of normal control without the execution of the rapid warm-up retard control.

In the following description, an operational mode in which the rapid warm-up retard control is executed will be referred to as "FIRE mode".

The CPU 5b supplies a signal for driving each fuel injection valve 6 according to the fuel injection period TOUT obtained above to each fuel injection valve 6, and also supplies a signal for driving each spark plug 11 according to the ignition timing IGLOG obtained above. Further, the CPU 5b calculates a valve opening control amount ICMD for controlling the valve opening amount of the auxiliary air control valve 18 according to engine operating conditions, and supplies a drive signal corresponding to the valve opening control amount ICMD calculated above to the auxiliary air control valve 18. In the FIRE mode (and in a transient state immediately after the end of the FIRE mode), the CPU 5b calculates the valve opening control amount ICMD in accordance with Eq. (3). The amount of air supplied through the auxiliary air control valve 18 into the engine 1 is proportional to the valve opening control amount ICMD.

$$ICMD = (IFIR + ILOAD) \times KIPA + IPA \qquad (3)$$

IFIR is a FIRE mode control term used in the FIRE mode (and in the transient state immediately after the end of the FIRE mode).

ILOAD is a load correction term set according to whether various loads such as an electrical load, a compressor load of an air conditioner, and a power steering load on the engine 1 are ON or OFF or whether or not the automatic transmission is in the in-gear condition.

KIPA and IPA are an atmospheric pressure correction coefficient and an atmospheric pressure correction term both set according to the atmospheric pressure PA, respectively.

Figure 2:
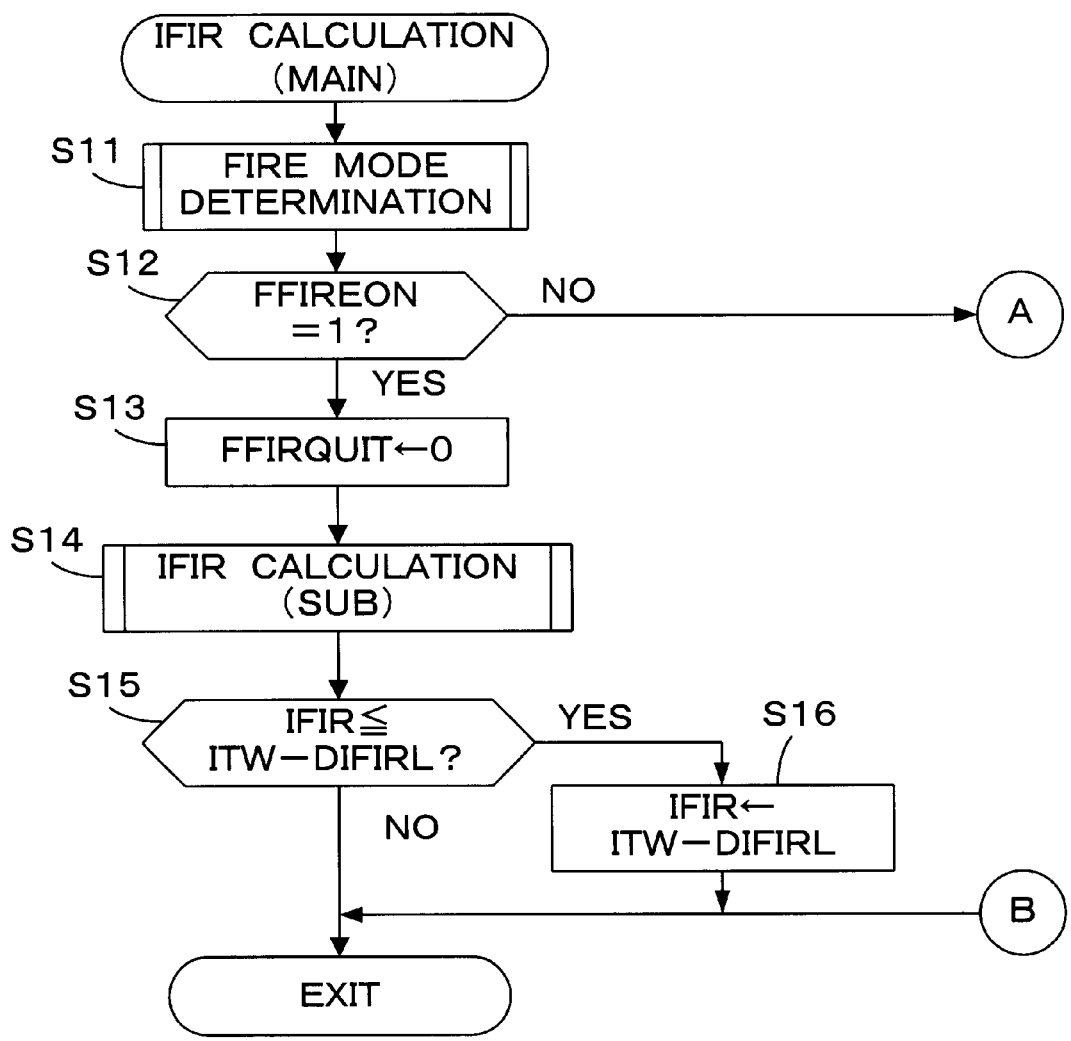
FIGS. 2 and 3 are flowcharts showing a main routine for calculation of a control amount (IFIR) of an auxiliary air control valve according to the preferred embodiment.
Figure 3:
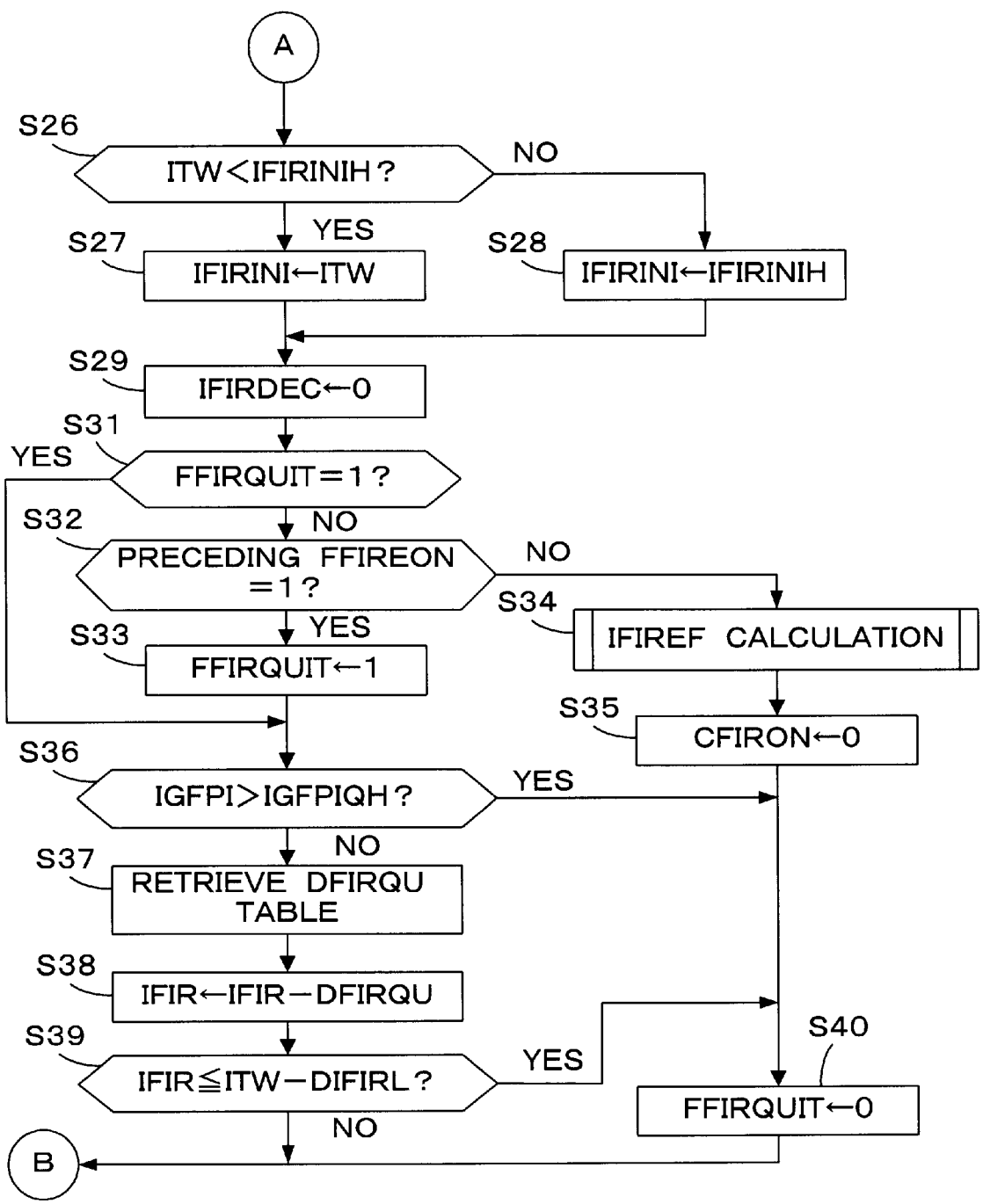

FIGS. 2 and 3 are flowcharts showing a main routine for calculation of the FIRE mode control term IFIR in the FIRE mode and immediately after the end of the FIRE mode. This routine is executed in synchronism with the generation of a TDC signal pulse in the CPU 5b.

Figure 5:
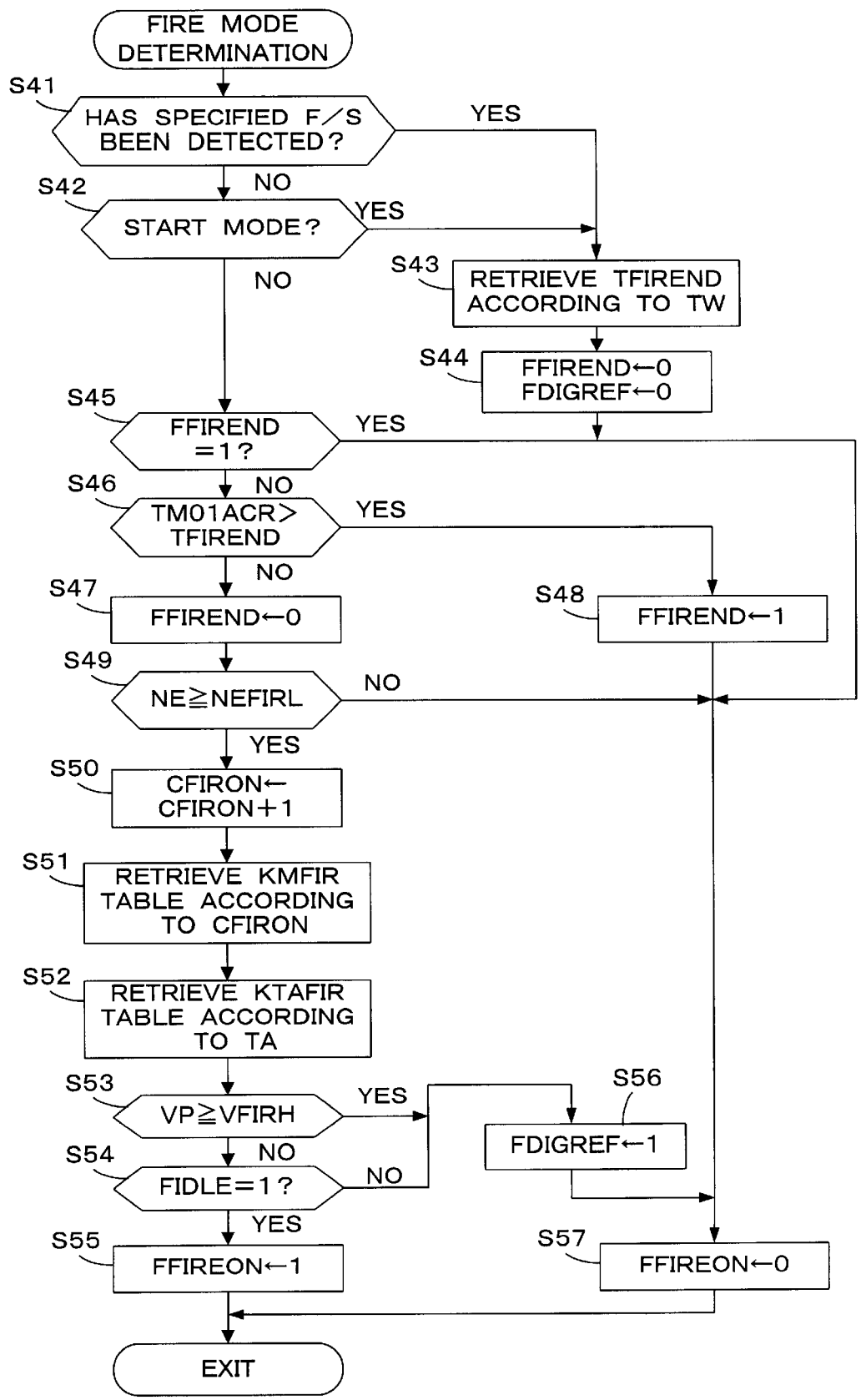
FIG. 5 is a flowchart showing a process for determining whether or not catalyst temperature rise acceleration control is to be executed.

In step S11, FIRE mode determination process shown in FIG. 5 is executed. The FIRE mode determination process includes steps of setting a FIRE mode flag FFIREON to "1", indicating permission to transition to the FIRE mode or continuation of the FIRE mode.

Figure 7:
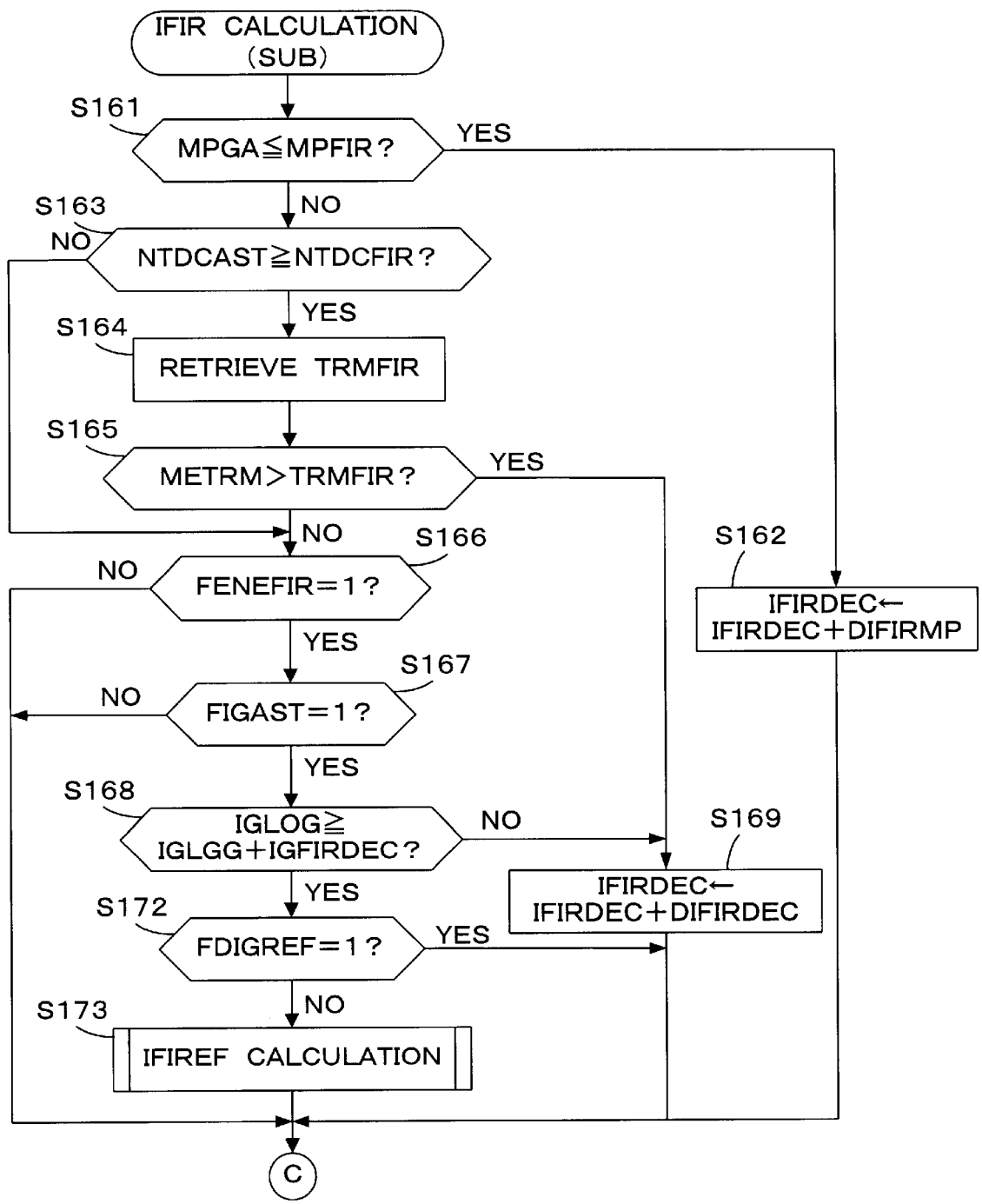
FIGS. 7 and 8 are flowcharts showing a subroutine for calculation of the control amount (IFIR) of the auxiliary air control valve.
Figure 8:
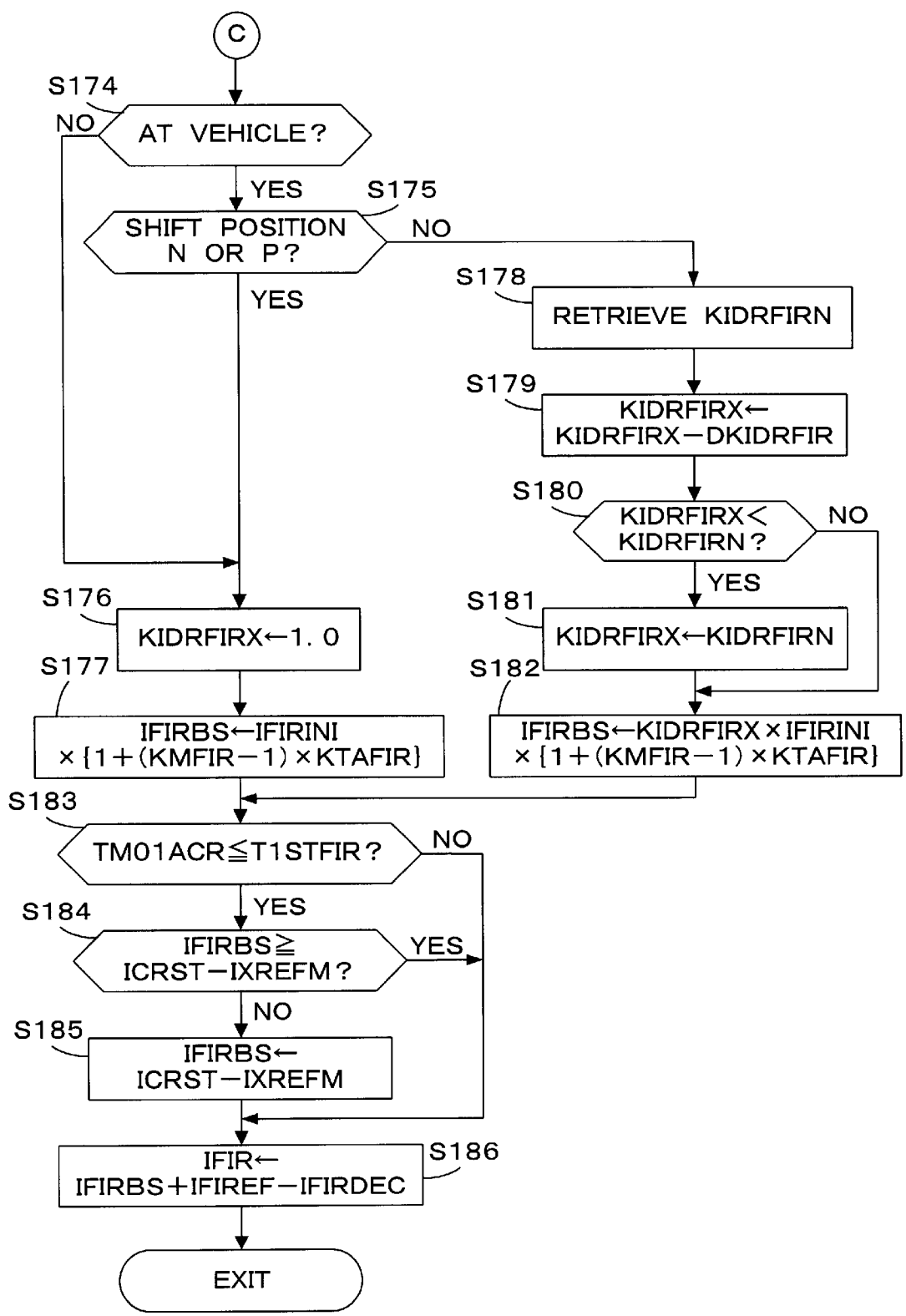

In step S12, it is determined whether or not the FIRE mode flag FFIREON is "1". If FFIREON is "0", which indicates that the transition to the FIRE mode or the continuation of the FIRE mode is not allowed, then the process proceeds to step S26 (FIG. 3). When FFIREON is "1", a transient control flag FFIRQUIT is set to "0" (step S13), and an IFIR calculation subroutine shown in FIGS. 7 and 8 is executed (step S14). The transient control flag FFIRQUIT of "1" indicates the duration of execution of transient control immediately after the end of the FIRE mode. Thereafter, it is determined whether or not the FIRE mode control term IFIR calculated in step S14 is less than or equal to a lower limit obtained by subtracting DIFIRL from ITW. DIFIRL is a predetermined value for lower limit setting (e.g., a value corresponding to an air amount of 100 liters/min). ITW is an engine coolant temperature control term set according to the engine coolant temperature TW. The engine coolant temperature control term ITW is a control term used for control of the auxiliary air control valve 18 in an engine operating condition such as an idling operation other than the FIRE mode (step S15). If IFIR is greater than ITW minus DIFIRL, the process ends. When IFIR is less than or equal to ITW minus DIFIRL, the FIRE mode control term IFIR is set to the lower limit (ITW−DIFIRL) (step S16) and the process ends.

In step S26 shown in FIG. 3, it is determined whether or not the engine coolant temperature control term ITW is less than an upper limit initial value IFIRINIH (e.g., a value corresponding to an intake air amount of 600 liters/min). If ITW is less than IFIRINIH, an initial value IFIRINI, used in steps S177 and S182 shown in FIG. 8, is set to the engine coolant temperature control term ITW (step S27). When ITW is greater than or equal to IFIRINIH, the initial value IFIRINI is set to the upper limit initial value IFIRINIH (step S28).

In step S29, a subtraction correction value IFIRDEC, updated in step S162 or step S169 shown in FIG. 7 and used in step S186 shown in FIG. 8, is set to "0". Thereafter, it is determined whether or not the transient control flag FFIRQUIT is "1" (step S31). If FFIRQUIT is "1", which indicates that the transient control is being performed, the process proceeds directly to step S36. If FFIRQUIT is "0", which indicates that the transient control is not being performed, it is determined whether or not the FIRE mode flag FFIREON was "1" at the preceding cycle (at the preceding execution of this process) (step S32). If the preceding FFIREON was "1", which indicates a condition immediately after the end of the FIRE mode, the transient control flag FFIRQUIT is set to "1" (step S33), and the process proceeds to step S36.

Figure 9:
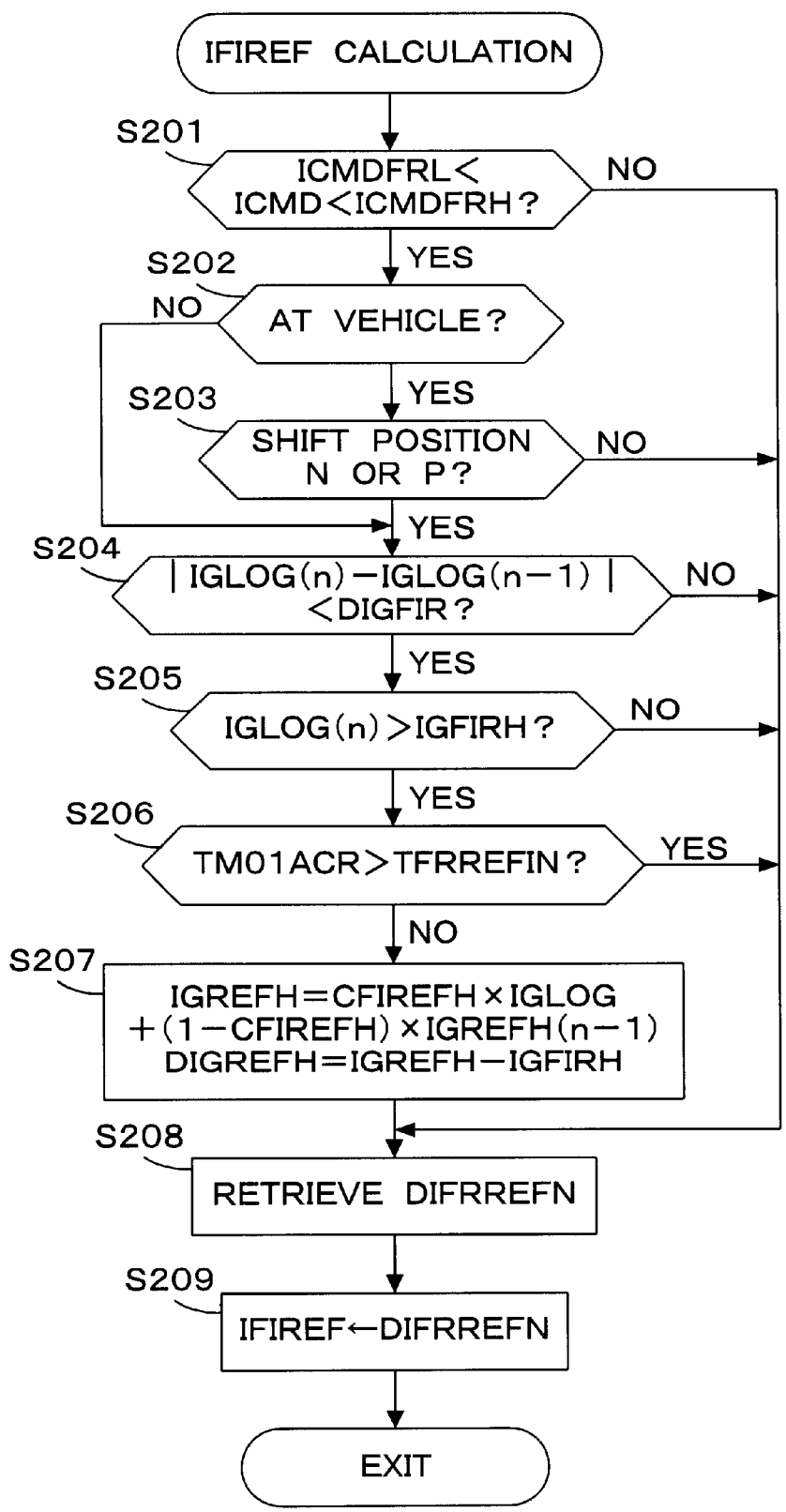
FIG. 9 is a flowchart showing a process for calculating a learning correction value (IFIREF) of the control amount (IFIR) of the auxiliary air control valve.

If the preceding FFIREON is "0" in step S32, IFIREF calculation process shown in FIG. 9 is executed (step S34). In the IFIREF calculation process, a learning correction value IFIREF of the FIRE mode correction term IFIR is calculated according to a learning value IGREFH of the ignition timing. In step S35, a FIRE mode on-counter CFIRON is set to "0", and the transient control flag FFIRQUIT is set to "0" (step S40). CFIRON is a counter that is incremented in step S50 shown in FIG. 5 to count the number of repetitions of the FIRE mode. Thereafter, the process ends.

In step S36, it is determined whether or not the retard correction term IGFPI of the ignition timing IGLOG is greater than a threshold IGFPIQH (e.g., −3 deg) for determination of ending of the transient control. If IGFPI is greater than IGFPIQH, which indicates that the absolute value of the retard correction term IGFPI is small (the retard amount is small), the process proceeds to step S40, so as to end the transient control.

Figure 4:
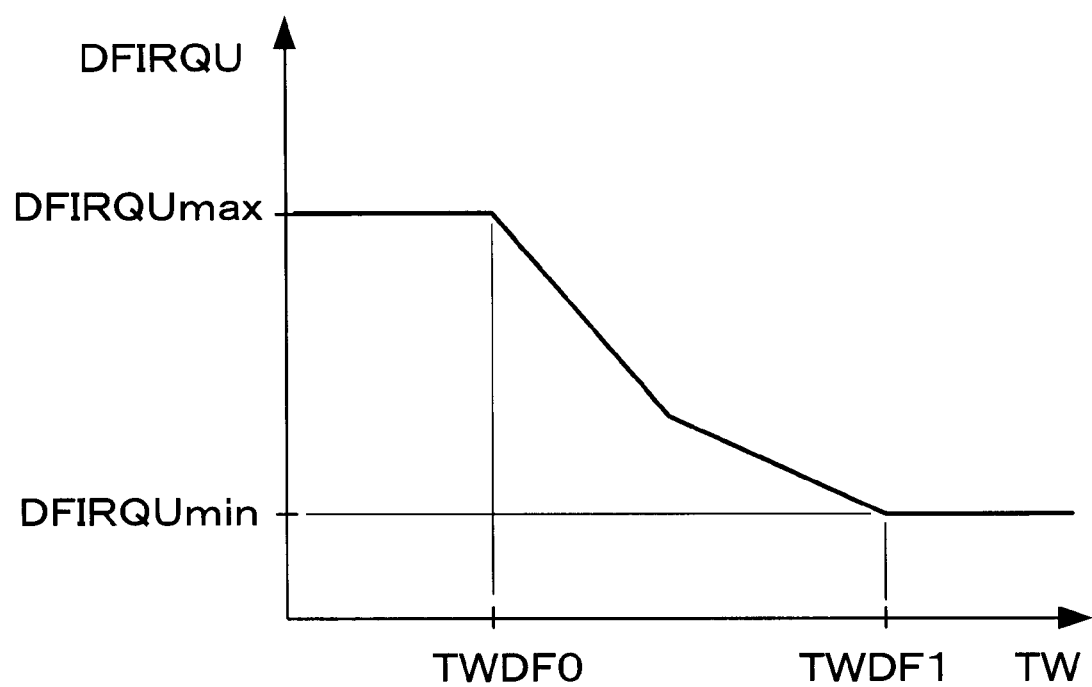
FIG. 4 is a graph showing a table used in the process shown in FIG. 3.

If IGFPI is less than or equal to IGFPIQH in step S36, a DFIRQU table shown in FIG. 4 is retrieved according to the engine coolant temperature TW to calculate a transient control subtraction value DFIRQU (step S37). The DFIRQU table is set so that the transient control subtraction value DFIRQU decreases with an increase in the engine coolant temperature TW. In FIG. 4, DFIRQUmax and DFIRQUmin are set to a value corresponding to an intake air amount of 5 liters/min and a value corresponding to an intake air amount of 2 liters/min, respectively, for example, and TWDF0 and TWDF1 are set to 28 degrees Centigrade and 62 degrees Centigrade, respectively, for example.

In step S38, the FIRE mode control term IFIR is decremented by the transient control subtraction value DFIRQU. Thereafter, it is determined whether or not the FIRE mode control term IFIR is less than or equal to the lower limit obtained by subtracting the predetermined value DIFIRL from the engine coolant temperature control term ITW (step S39). If IFIR is greater than (ITW−DIFIRL), the process ends at once. If IFIR is less than or equal to (ITW−DIFIRL), step S40 is executed and the process then ends.

As mentioned above, the process shown in FIG. 3 executes steps of setting the initial value IFIRINI of the FIRE mode control term IFIR (steps S26 to S28), the steps of the transient control immediately after ending the FIRE mode (steps S31 to S38), the steps of initialization of the parameters used in the control to be hereinafter described (steps S29 and S35), and the step of calculating the learning correction value IFIREF (step S34). By executing the transient control, the intake air amount increased in the FIRE mode is gradually returned to a value in the normal control.

Figure 6A:
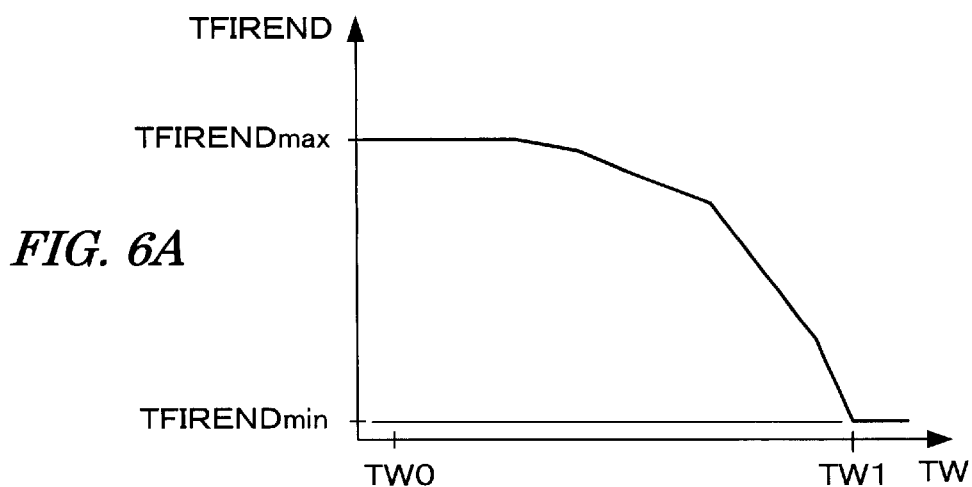
FIGS. 6A to 6C are graphs showing tables used in the process shown in FIG. 5.

FIG. 5 is a flowchart showing the FIRE mode determination process executed in step S11 shown in FIG. 2. In step S41, it is determined whether or not a specified failure has already been detected. If the specified failure has not been detected, it is determined whether or not the engine 1 is at starting (at cranking) (step S42). If the answer to either step S41 or S42 is affirmative (YES), a TFIREND table shown in FIG. 6A is retrieved according to the engine coolant temperature TW to calculate a FIRE mode end time TFIREND referred in step S46 to be hereinafter described (step S43). The TFIREND table is set so that the FIRE mode end time TFIREND decreases with an increase in the engine coolant temperature TW. In FIG. 6A, TFIRENDmax and TFIRENDmin are set to 50 seconds and 2 seconds, respectively, for example, and TW0 and TW1 are set to −10 degrees Centigrade and 75 degrees Centigrade, respectively, for example.

In step S44, an end flag FFIREND and a learning inhibit flag FDIGREF is set to "0". The end flag FFIREND of "1" indicates the ending of the FIRE mode, and the learning inhibit flag FDIGREF of "1" indicates the inhibition of calculation of the learning correction value IFIREF. Thereafter, the FIRE mode flag FFIREON is set to "0" (step S57), and the process ends.

If the answers to steps S41 and S42 are both negative (NO), it is determined whether or not the end flag FFIREND is "1" (step S45). If FFIREND is "1", the process proceeds directly to step S57. If FFIREND is "0", it is determined whether or not the value of an upcount timer TM01ACR for measuring an elapsed time from the time when the starting of the engine 1 has been completed (when the cranking has been finished) has exceeded the FIRE mode end time TFIREND calculated in step S43 (step S46). If TM01ACR is greater than TFIREND, the end flag FFIREND is set to "1", so as to end the FIRE mode (step S48), and the process proceeds to step S57.

Figure 6B:
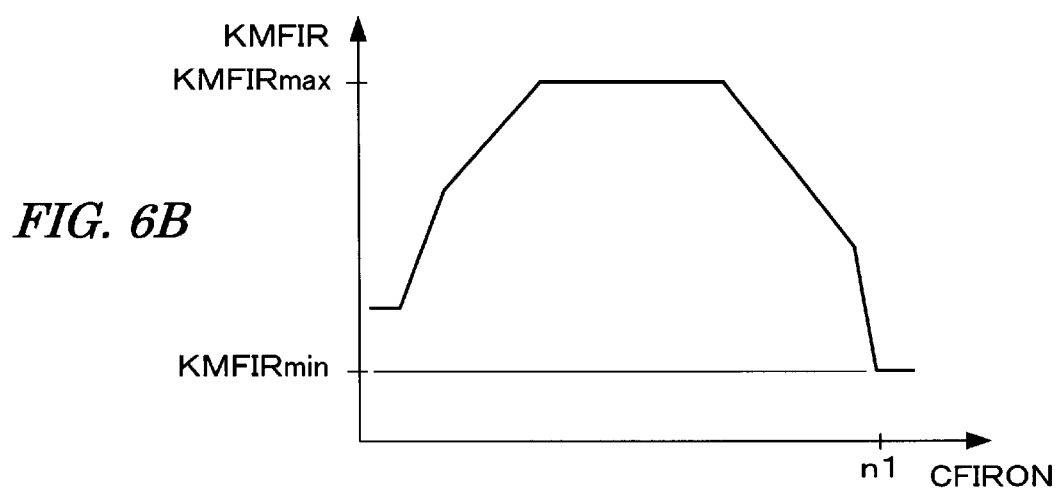

If TM01ACR is less than or equal to TFIREND in step S46, the end flag FFIREND is set to "0" (step S47). Next, it is determined whether or not the engine rotational speed NE is greater than or equal to a predetermined lower limit rotational speed NEFIRL (e.g., 700 rpm) (step S49). If NE is less than NEFIRL, the process proceeds to step S57. If NE is greater than or equal to NEFIRL, the FIRE mode on counter CFIRON is incremented by "1" (step S50), and a KMFIR table shown in FIG. 6B is retrieved according to the value of the counter CFIRON to calculate a continuation time correction coefficient KMFIR used in the process shown in FIG. 8 (step S51). The KMFIR table is set so that the correction coefficient KMFIR increases with an increase in the value of the counter CFIRON and decreases with a further increase in the value of the counter CFIRON. In FIG. 6B, KMFIRmax and KMFIRmin are set to 2.625 and 1.0, respectively, for example, and n1 is set to 2000, for example.

Figure 6C:
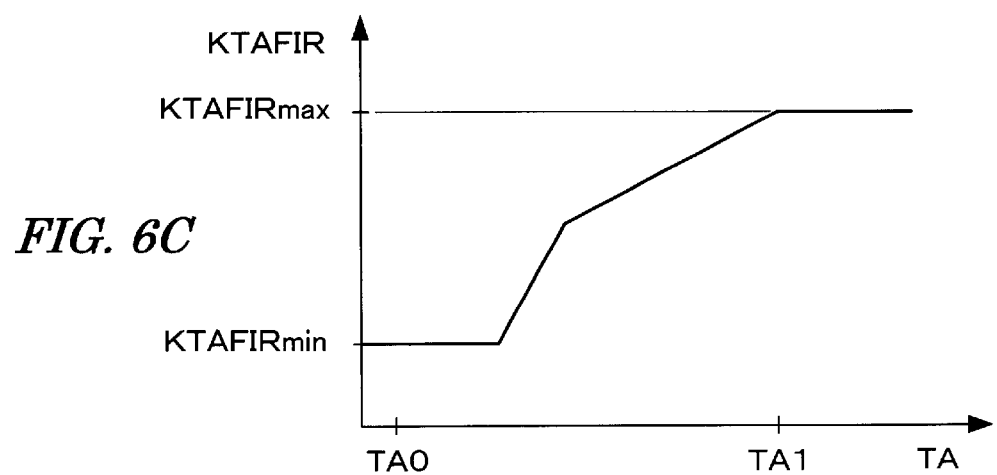

In step S52, a KTAFIR table shown in FIG. 6C is retrieved according to the intake air temperature TA to calculate an intake air temperature correction coefficient KTAFIR used in the process shown in FIG. 8. The KTAFIR table is set so that the correction coefficient KTAFIR increases with an increase in the intake air temperature TA. In FIG. 6C, KTAFIRmax and KTAFIRmin are set to 2.0 and 1.0, respectively, for example, and TA0 and TA1 are set to −10 degrees Centigrade and 80 degrees Centigrade, respectively, for example.

In step S53, it is determined whether or not the vehicle speed VP is greater than or equal to a predetermined vehicle speed VFIRH (e.g., 5 km/h). If VP is less than VFIRH, it is determined whether or not an idle flag FIDLE is "1", indicating the idling condition of the engine 1 (step S54). If VP is greater than or equal to VFIRH, which indicates that the vehicle is running, or if FIDLE is "0", which indicates that the engine 1 is not in the idling condition, the learning inhibit flag FDIGREF is set to "1" (step S56), and the process proceeds to step S57, in which the FIRE mode flag FFIREON is set to "0". On the other hand, if VP is less than VFIRH and the engine 1 is in the idling condition, the FIRE mode flag FFIREON is set to "1" (step S55), and the process ends.

FIGS. 7 and 8 are flowcharts of the IFIR calculation subroutine executed in step S14 shown in FIG. 2.

In step S161, it is determined whether or not the pressure difference MPGA (=PA−PBB) between the brake booster pressure PBB and the atmospheric pressure PA is less than or equal to a predetermined pressure MPFIR (e.g., 26.7 kPa (200 mmHg)). If MPGA is less than or equal to MPFIR, which indicates that the brake booster pressure PBB is high, a subtraction correction value IFIRDEC applied to the calculation in step S186 described below is incremented by a predetermined value DIFIRMP (step S162), and the process proceeds to step S174 (FIG. 8). By increasing the subtraction correction value IFIRDEC, the FIRE mode control term IFIR decreases to decrease the intake air amount.

Figure 10A:
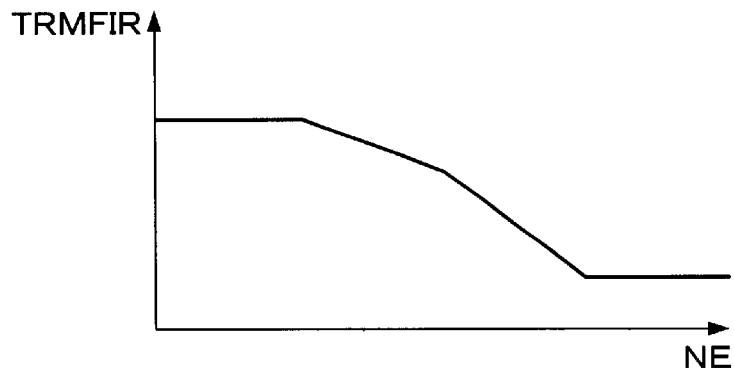
FIGS. 10A to 10C are graphs showing tables used in the processes of FIGS. 7, 8, and 9, respectively.

If MPGA is greater than MPFIR in step S161, which indicates that a sufficient negative pressure is accumulated in the brake booster 32, it is determined whether or not an after start TDC number NTDCAST as the number of TDC signal pulses generated after starting of the engine 1 is greater than or equal to a predetermined number NTDCFIR (e.g., 200) (step S163). Immediately after starting of the engine 1, NTDCAST is less than NTDCFIR, and the process accordingly proceeds to step S166. When the after start TDC number NTDCAST thereafter reaches the predetermined number NTDCFIR, the process proceeds from step S163 to step S164. In step S164, a TRMFIR table shown in FIG. 10A is retrieved according to the engine rotational speed NE to calculate a combustion stability determination threshold TRMFIR. The TRMFIR table is set so that the threshold TRMFIR decreases with an increase in the engine rotational speed NE.

In step S165, it is determined whether or not a rotation fluctuation parameter METRM indicating the amount of rotation fluctuation of the engine 1 is greater than the threshold TRMFIR. The rotation fluctuation parameter METRM is defined by Eq. (4) shown below.

$$METRM=|MSME(n)-MSME(n-1)|/KMSSLB \qquad (4)$$

where KMSSLB is a coefficient set so as to be inversely proportional to the engine rotational speed NE, and MSME (n) is an average of time periods CRME(n) between adjacent CRK signal pulses, i.e., time periods each required for 30° rotation of the crankshaft, as defined in Eqs. (5) and (6) shown below. In Eq. (4), (n) and (n−1) indicate a present value and a preceding value, respectively.

$$CR12ME(n) = \sum_{i=-11}^{0} CRME(n+i)/12 \qquad (5)$$

$$MSME(n) = \sum_{i=-5}^{0} CR12ME(n+i)/6 \qquad (6)$$

More specifically, an average of 12 CRME values from a preceding value CRME(n−11) measured 11 cycles before to the latest measured value CRME(n) is calculated from Eq. (5) to obtain a first average CR12ME(n). Further, an average of 6 CR12ME values from a previous value CR12ME(n−5) calculated 5 cycles before to the latest calculated value CR12ME(n) is calculated from Eq. (6) to obtain a second average MSME(n). Thereafter, this second average MSME (n) is applied to Eq. (4) to thereby calculate the rotation fluctuation parameter METRM. The rotation fluctuation parameter METRM has a tendency to increase with a deterioration in the combustion condition of the engine 1, so that this parameter METRM can be used as a parameter indicative of the combustion condition of the engine 1.

If METRM is greater than TRMFIR in step S165, which indicates that the combustion fluctuation is large, the subtraction correction value IFIRDEC is incremented by the predetermined value DIFIRDEC (step S169), and the process proceeds to step S174 (FIG. 8).

If METRM is less than or equal to TRMFIR in step S165, the process proceeds to step S166, in which it is determined whether or not a rotational speed addition flag FENEFIR (see FIG. 16) is "1". The rotational speed addition flag FENEFIR of "1" indicates that the target rotational speed NOBJ in the ignition timing feedback control described below is increased. If FENEFIR is "1", which indicates that the target rotational speed NOBJ is not increased, it is determined whether or not a normal ignition flag FIGAST is "1" (step S167). The normal ignition flag FIGAST is set to "0" at starting of the engine 1, and set to "1" when the transient control after starting of the engine 1 is ended to be shifted to the normal ignition timing control. If the answer to either step S166 or S167 is negative (NO), that is, if FENEFIR is "0" or FIGAST is "0", the process proceeds to step S174.

If both the flags FENEFIR and FIGAST are "1", it is determined whether or not the ignition timing IGLOG is greater than or equal to a value obtained by adding a stick determination value IGFIRDEC (e.g., 1 deg) to a lower limit IGLGG (e.g., −20 deg) (step S168). If IGLOG is less than (IGLGG+IGFIRDEC), which indicates that the retard amount of the ignition timing is large, the process proceeds to step S169, in which the subtraction correction value IFIRDEC is incremented to decrease the intake air amount.

If IGLOG is greater than or equal to (IGLGG+IGFIRDEC), it is determined whether or not the learning inhibit flag FDIGREF is "1" (step S172). If FDIGREF is "1", the process proceeds to step S174. If FDIGREF is "0", an IFIREF calculation process shown in FIG. 9 is executed to calculate a learning correction value IFIREF (step S173). Thereafter, the process proceeds to step S174.

Figure 10B:
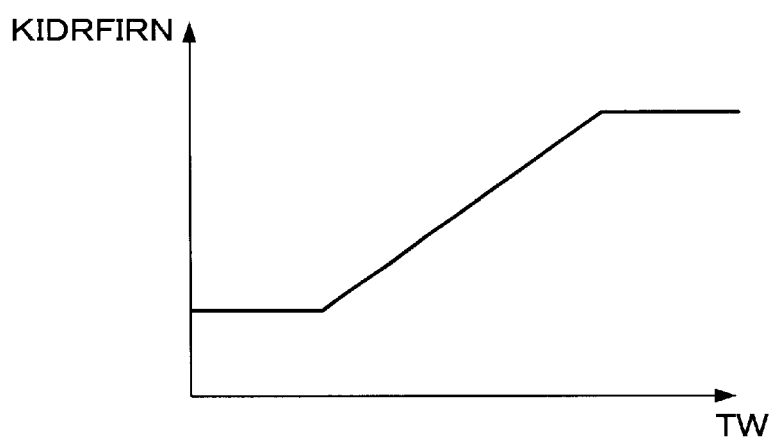

In step S174, it is determined whether or not the vehicle on which the engine 1 is mounted is provided with an automatic transmission. If the vehicle is provided with a manual transmission, the process proceeds to step S176. If the vehicle is provided with an automatic transmission, it is determined whether or not the shift position SFT of the automatic transmission is in a neutral range N or a parking range P (step S175). If the shift position SFT is in any range other than the neutral range N and the parking range P, that is, if the automatic transmission is in the in-gear condition, a KIDRFIRN table shown in FIG. 10B is retrieved according to the engine coolant temperature TW to calculate a lower limit KIDRFIRN of an in-gear correction coefficient KIDRFIRX (step S178). The in-gear correction coefficient KIDRFIRX is next decremented by a predetermined amount DKIDRFIR (step S179), and it is determined whether or not the in-gear correction coefficient KIDRFIRX updated in step S179 is less than the lower limit KIDRFIRN calculated in step S178 (step S180). If KIDRFIRX is greater than or equal to KIDRFIRN, the process proceeds directly to step S182. If KIDRFIRX is less than KIDRFIRN, the in-gear correction coefficient KIDRFIRX is set to the lower limit KIDRFIRN (step S181), and the process next proceeds to step S182.

In step S182, a basic value IFIRBS of the FIRE mode control term IFIR is calculated from Eq. (7) shown below.

$$IFIRBS = IFIRINI \times KIDRFIRX \times (1 + (KMFIR - 1) \times KTAFIR) \quad (7)$$

KMFIR and KTAFIR are the continuation time correction coefficient and the intake air temperature correction coefficient calculated in steps S51 and S52 shown in FIG. 5, respectively. KIDRFIRX is the in-gear correction coefficient mentioned above. IFIRINI is the initial value set in step S27 or S28 shown in FIG. 3. The continuation time correction coefficient KMFIR changes with elapsed time (an increase in the value of the counter CFIRON) as shown in FIG. 6B, so that the intake air amount is basically controlled so as to gradually increase from the start of the FIRE mode, subsequently gradually decrease, and subsequently maintain a substantially constant value (see FIG. 17A). The in-gear correction coefficient KIDRFIRX is set so as to gradually decrease down to the lower limit KIDRFIRN in the in-gear condition of the automatic transmission.

If the shift position SFT is in the neutral range N or the parking range P in step S175, the process proceeds to step S176, in which the in-gear correction coefficient KIDRFIRX is set to "1.0". Thereafter, a basic value IFIRBS of the FIRE mode control term IFIR is calculated from Eq. (8) shown below (step S177). Eq. (8) corresponds to an equation given by setting KIDRFIRX to "1" in Eq. (7).

$$IFIRBS = IFIRINI \times (1 + (KMFIR - 1) \times KTAFIR) \quad (8)$$

After ending the calculation of the basic value IFIRBS in step S177 or S182, it is determined whether or not the value of an upcount timer TM01ACR for measuring the time elapsed after starting of the engine 1 is less than or equal to a predetermined time T1STFIR (e.g., 1.0 sec) (step S183). If TM01ACR is less than or equal to T1STFIR, it is determined whether or not the basic value IFIRBS calculated in step S177 or S182 is greater than or equal to a value obtained by subtracting an idle learning value IXREFM from an idle start initial value ICRST (step S184). If IFIRBS is less than (ICRST−IXREFM), the basic value IFIRBS is set to (ICRST−IXREFM) (step S185), and the process proceeds to step S186.

If the value of the timer TM01ACR exceeds the predetermined time T1STFIR in step S183 or if the basic value IFIRBS is greater than or equal to (ICRST−IXREFM) in step S184, the process proceeds to step S186.

In step S186, the basic value IFIRBS, the learning correction value IFIREF calculated in step S173, and the subtraction correction value IFIRDEC updated in step S162 or S169 are applied to Eq. (9) shown below to calculate the FIRE mode control term IFIR.

$$IFIR = IFIRBS + IFIREF - IFIRDEC \quad (9)$$

By subtracting the subtraction correction value IFIRDEC (>0), the intake air amount is corrected to decrease when the brake booster pressure PBB is high (steps S161 and S162). Accordingly, the absolute intake pressure PBA decreases, which makes the brake booster pressure PBB decrease, so that the braking force by the brake booster 32 can be prevented from becoming too small.

Further, when the rotation fluctuation of the engine 1 becomes large or the ignition timing IGLOG sticks to a value in the vicinity of the lower limit, the intake air amount is corrected to decrease by the subtraction correction value IFIRDEC (steps S165, S168, and S169), thereby avoiding that the discharge of unburned fuel may increase or that the retard correction of the ignition timing IGLOG may become impossible (the engine rotational speed NE cannot be made equal to the target rotational speed NEFIR).

FIG. 9 is a flowchart of the IFIREF calculation process executed in step S34 shown in FIG. 3 or in step S173 shown in FIG. 7.

In step S201, it is determined whether or not the valve opening control amount ICMD is in the range from a predetermined lower limit ICMDFRL to a predetermined upper limit ICMDFRH. If ICMD is greater than or equal to ICMDFRH, or ICMD is less than or equal to ICMDFRL, the process jumps to step S208.

If ICMD is greater than ICMDFRL and less than ICMDFRH, it is determined whether or not the vehicle is provided with an automatic transmission (step S202). If the vehicle is provided with an automatic transmission, it is determined whether or not the shift position SFT of the automatic transmission is in a neutral range N or a parking range P (step S203). If the vehicle is provided with a manual transmission, or if the shift position SFT of the automatic transmission is in a neutral range N or a parking range P, the process proceeds from step S202 or S203 to step S204. If the shift position SFT of the automatic transmission is in any range other than the neutral range N and the parking range P, the process proceeds from step S203 to step S208.

If the vehicle is provided with a manual transmission or if the shift position SFT of the automatic transmission is a neutral range N or a parking range P, it is determined whether or not the absolute value |IGLOG(n)−IGLOG(n−1)| of a change in the ignition timing is less than a predetermined amount DIGFIR (step S204). If |IGLOG(n)−IGLOG(n−1)| is less than DIGFIR, which indicates that the change in the ignition timing is small, it is determined whether or not the ignition timing (present value) IGLOG(n) is greater than a predetermined ignition timing IGFIRH (step S205). The predetermined ignition timing IGFIRH is set to a value near a normally attainable minimum value of the ignition timing IGLOG in the FIRE mode and greater than (IGLGG+ IGFIRDEC) referred to in step S168 shown in FIG. 7.

If IGLOG(n) is greater than IGFIRH in step S205, it is determined whether or not the value of the timer TM01ACR indicating the elapsed time after engine starting exceeds a predetermined time TFRREFIN (e.g., 20 sec) (step S206). If the answer to step S204 or S205 is negative (NO), or if the answer to step S206 is affirmative (YES), the process proceeds to step S208. If the answer to step S206 is negative (NO), a learning value IGREFH of the ignition timing and a deviation DIGREFH between the learning value IGREFH and the predetermined ignition timing IGFIRH (which deviation will be hereinafter referred to as "learning value deviation") are calculated from Eqs. (10) and (11), respectively (step S207).

$$IGREFH = CFIREFH \times IGLOG + (1-CFIREFH) \times IGREFH(n-1) \quad (10)$$

$$DIGREFH = IGREFH - IGFIRH \quad (11)$$

CFIREFH is an averaging coefficient set to a value between "0" and "1", and IGREFH(n-1) is a preceding value of the learning value IGREFH.

Figure 10C:
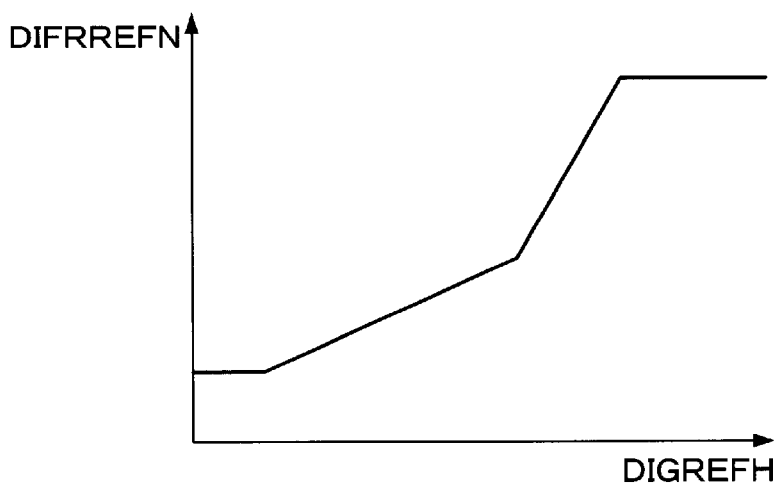

In step S208, a DIFRREFN table shown in FIG. 10C is retrieved according to the learning value deviation DIGREFH to calculate a valve opening control amount deviation DIFRREFN. The DIFRREFN table is set so that the valve opening control amount deviation DIFRREFN increases with an increase in the learning value deviation DIGREFH.

Thereafter, the learning correction value IFIREF is set to the valve opening control amount deviation DIFRREFN (step S209), and the process ends.

By using the learning correction value IFIREF calculated above, variations in the increase in the actual intake air amount due to variations in the valve opening characteristics of the auxiliary air control valve 18 or due to the aging deterioration of the auxiliary air control valve 18 can be corrected to thereby maintain the increase in the intake air amount substantially constant.

Figure 11:
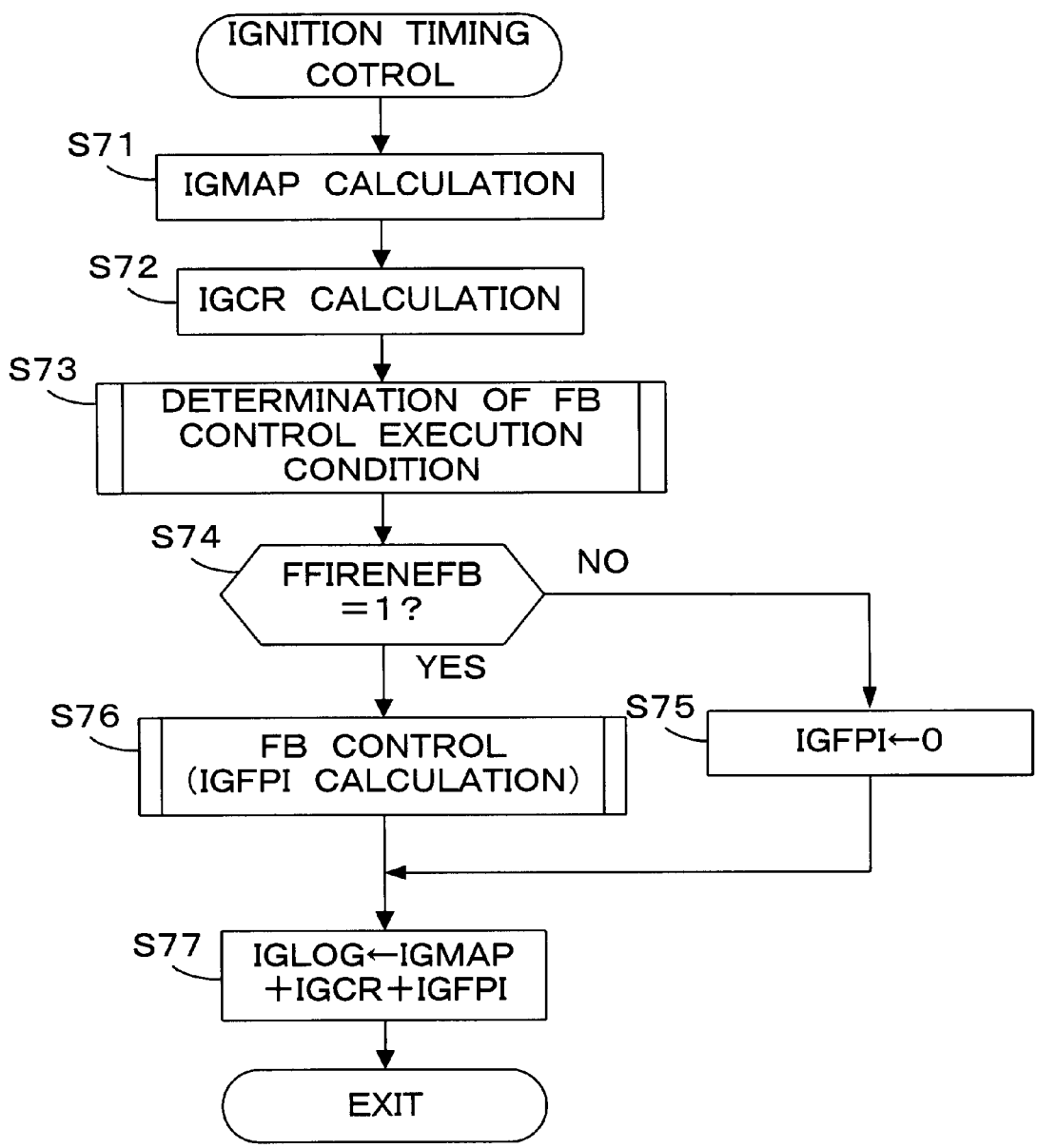
FIG. 11 is a flowchart showing a main routine for execution of ignition timing control.

FIG. 11 is a flowchart showing ignition timing control process, and this process is executed in synchronism with the generation of a TDC signal pulse in the CPU 5b.

Figure 12:
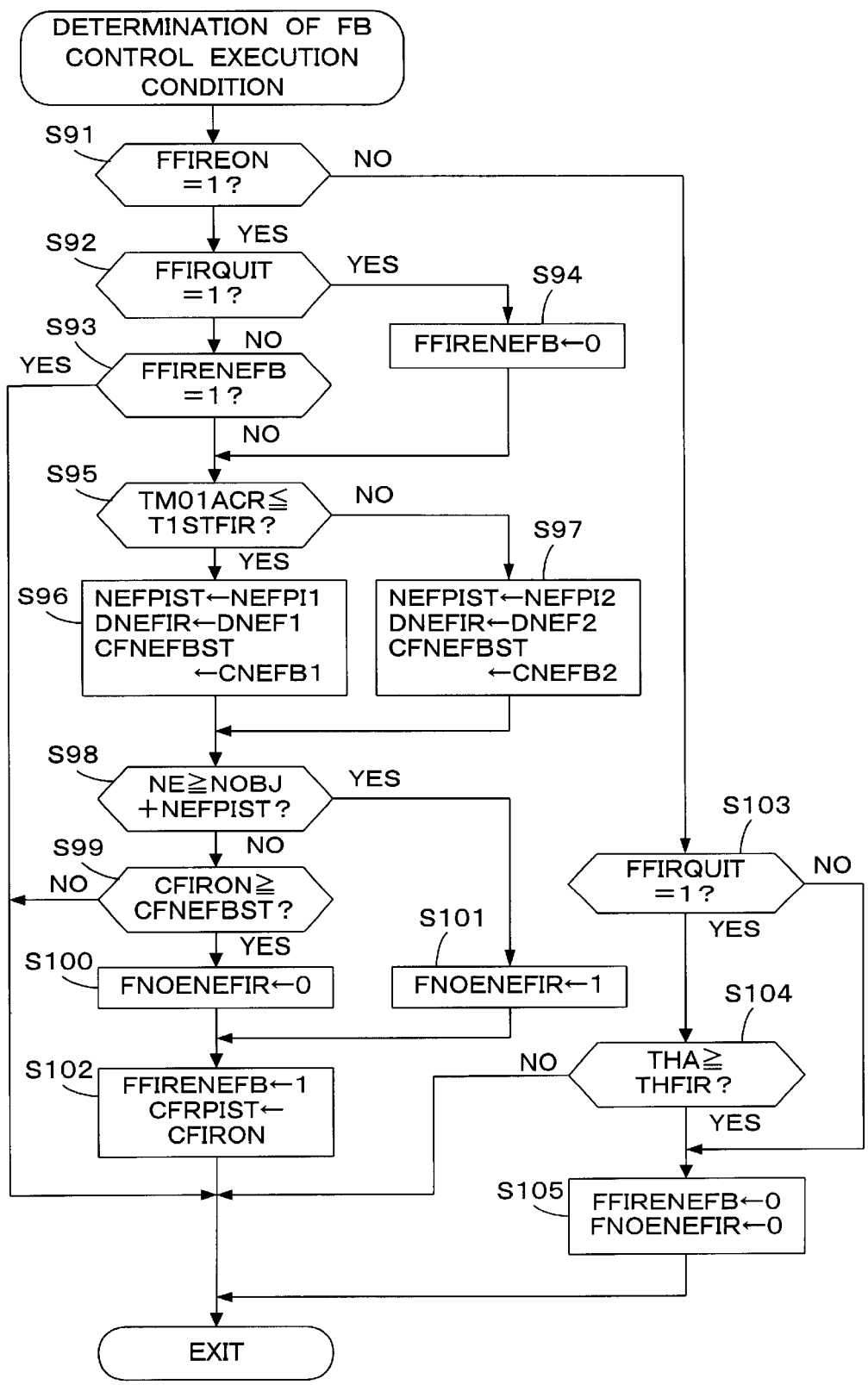
FIG. 12 is a flowchart showing a process for determining execution condition of a feedback control of the ignition timing.

In step S71, a basic ignition timing IGMAP is calculated according to the engine rotational speed NE and the absolute intake pressure PBA. Thereafter, a correction term IGCR other than the retard correction term IGFPI is calculated (step S72). In step S73, a feedback (FB) control execution condition determination process shown in FIG. 12 is executed. This process is performed to determine execution condition of the feedback control in which the ignition timing is controlled so that the engine rotational speed NE detected coincides with the FIRE mode target rotational speed NEFIR. If the execution condition is satisfied, a feedback control flag FFIRENEFB is set to "1".

In step S74, it is determined whether or not the feedback control flag FFIRENEFB is "1". If FFIRENEFB is "0", the retard correction term IGFPI is set to "0" (step S75). If FFIRENEFB is "1", which indicates that the execution condition is satisfied, the feedback control is executed to set the retard correction term IGFPI according to the engine rotational speed NE (step S76).

In step S77, the ignition timing IGLOG is calculated in accordance with Eq. (2) mentioned above. Thereafter, the process ends.

FIG. 12 is a flowchart showing the FB control execution condition determination process executed in step S73 shown in FIG. 11. In step S91, it is determined whether or not the FIRE mode flag FFIREON is "1". If FFIREON is "0", which indicates that the FIRE mode is off, it is determined whether or not the transient control flag FFIRQUIT is "1" (step S103). If FFIRQUIT is "0", which indicates that the transient control is off, both the feedback control flag FFIRENEFB and a target rotational speed flag FNOENEFIR are set to "0" (step S105). The target rotational speed flag FNOENEFIR of "1" indicates that the target rotational speed during the feedback control is not increased (see step S141 in FIG. 16). Thereafter, the process ends.

If FFIRQUIT is "1" in step S103, which indicates that the transient control is on, it is determined whether or not the throttle valve opening THA is greater than or equal to a predetermined valve opening THFIR (e.g., 0.88 deg) (step S104). If THA is less than THFIR, which indicates that the throttle valve is in a substantially fully closed condition, the process ends at once. If THA is greater than or equal to THFIR, the process proceeds to step S105. When the process ends directly from step S104, the flag FFIRENEFB is maintained at "1" even if the flag FFIREON is "0". Accordingly, the feedback control is continued.

If FFIREON is "1" in step S91, it is determined whether or not the transient control flag FFIRQUIT is "1" (step S92). If FFIRQUIT is "1", the feedback control flag FFIRENEFB is set to "0" (step S94), and the process proceeds to step S95. If FFIRQUIT is "0", it is determined whether or not feedback control flag FFIRENEFB has already been set to "1" (step S93). If FFIRENEFB is "1", the process ends at once. If FFIRENEFB is "0", the process proceeds to step S95.

In step S95, it is determined whether or not the value of the upcount timer TM01ACR for measuring an elapsed time after completion of engine starting (cranking) is less than or equal to a predetermined time T1STFIR (e.g., 1 msec). If TM01ACR is less than or equal to T1STFIR, which indicates that the engine 1 has just started, an addition value NEFPIST for the feedback control start determination, an addition value DNEFIR for the target rotational speed correction, and a count value CFNEFBST for the feedback control start determination are set to first values NEFPI1 (e.g., 200 rpm), DNEF1 (e.g., 1 rpm), and CFNEFB1 (e.g., 200), respectively (step S96). If TM01ACR is greater than T1STFIR, the addition value NEFPIST for the feedback control start determination, the addition value DNEFIR for the target rotational speed correction, and the count value CFNEFBST for the feedback control start determination are set to second values NEFPI2 (e.g., 200 rpm), DNEF2 (e.g., 12 rpm), and CFNEFB2 (e.g., 2), respectively (step S97).

In step S98, it is determined whether or not the engine rotational speed NE is greater than or equal to a value obtained by adding the addition value NEFPIST for the feedback control start determination to a target rotational speed NOBJ for the normal control. If NE is less than (NOBJ+NEFPIST), it is determined whether or not the value of the FIRE mode on counter CFIRON is greater than or equal to the count value CFNEFBST for feedback control start determination (step S99). If the answers to steps S98 and S99 are both negative (NO), which indicates that the engine rotational speed NE is low and the FIRE mode continuation time period is short, the feedback control is not executed and the process accordingly ends at once.

If NE is greater than or equal to (NOBJ+NEFPIST) in step S98, the target rotational speed flag FNOENEFIR is set to "1" (step S101). If CFIRON is greater than or equal to CFNEFBST in step S99, the target rotational speed flag FNOENEFIR is set to "0" (step S100). After executing step S101 or S100, the process proceeds to step S102. Accordingly, if the engine rotational speed NE at starting of the feedback control is high (NE is greater than or equal to NOBJ+NEFPIST), a target rotational speed addition value ENEFIR used for calculation of a FIRE mode target rotational speed NEFIR is set to "0" (see FIG. 16 and steps S117 and S118 in FIG. 13).

In step S102, the feedback control flag FFIRENEFB is set to "1", and the value of the FIRE mode on counter CFIRON is stored as a storage value CFRPIST.

Figure 13:
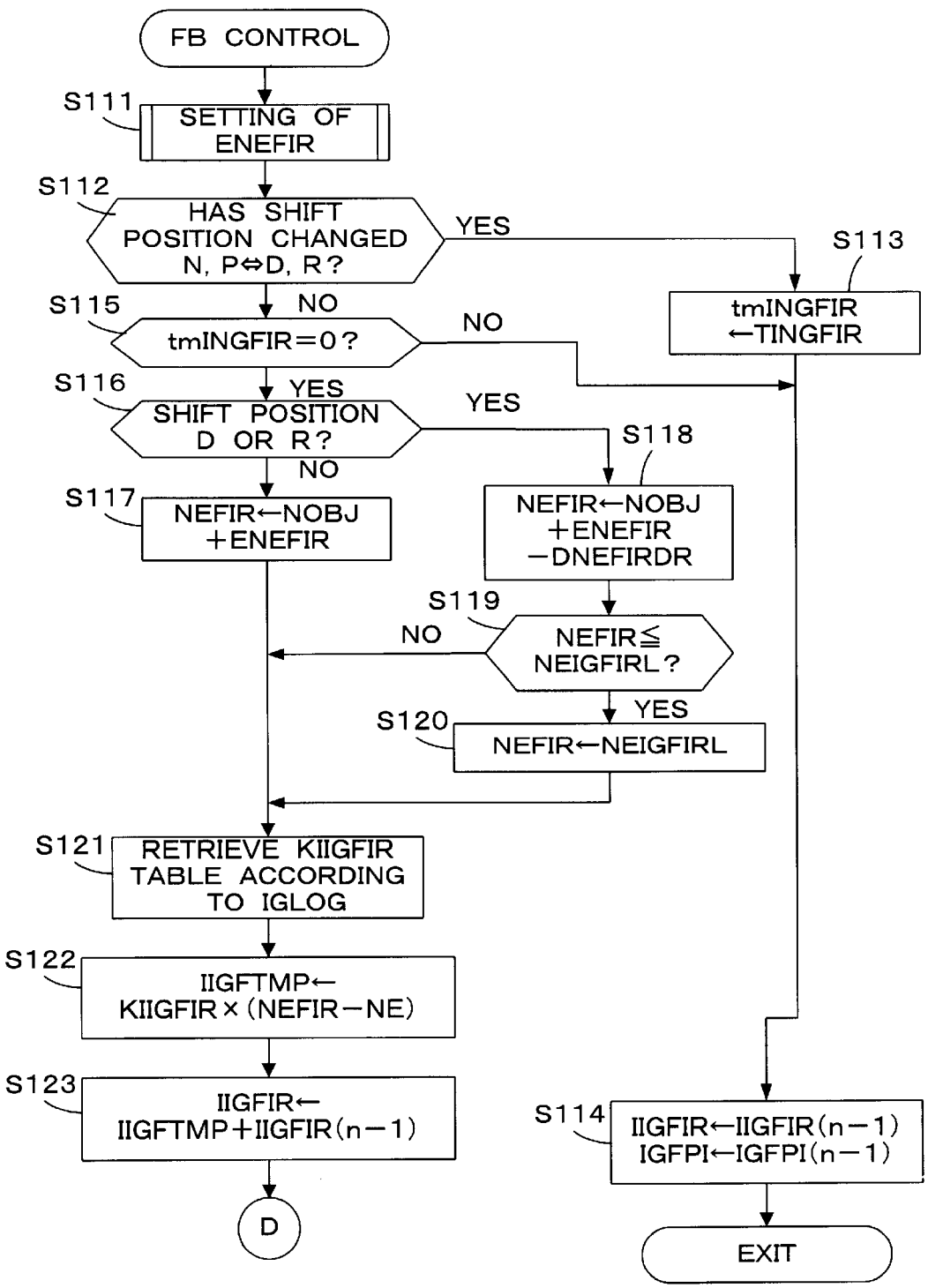
FIGS. 13 and 14 are flowcharts showing a process for executing the feedback control of the ignition timing.
Figure 14:
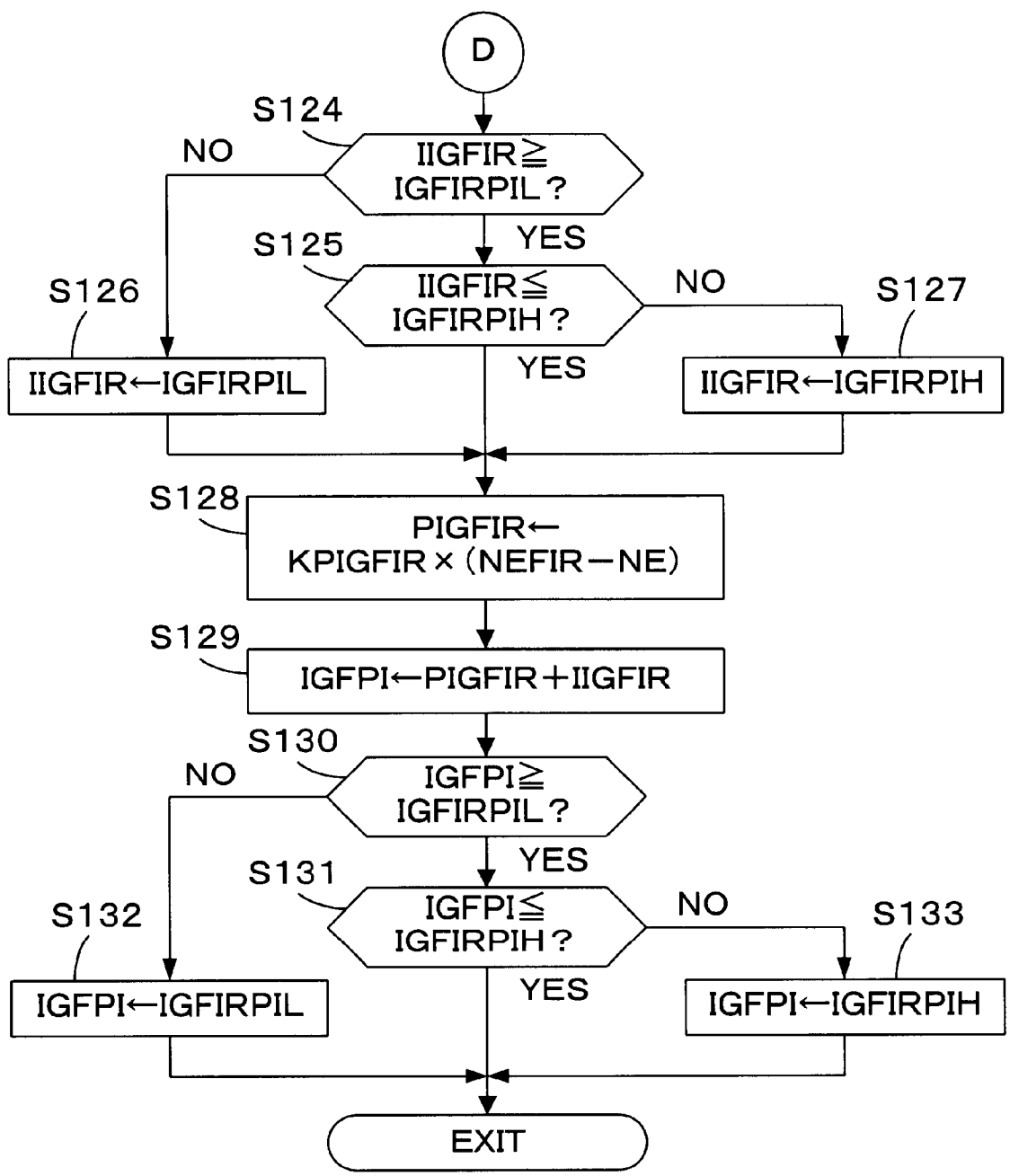

FIGS. 13 and 14 are flowcharts showing the feedback control process executed in step S76 shown in FIG. 11. In step S111, the process of setting the target rotational speed addition value ENEFIR (FIG. 16) is executed to set the addition value ENEFIR.

In step S112, it is determined whether or not the shift position SFT of the automatic transmission has been changed from a neutral range N or a parking range P to a drive range D or a reverse range R (in-gear condition), or vice versa. If the shift position has been changed, a predetermined time TINGFIR (e.g., 3 seconds) is set to a downcount timer tmINGFIR referred in step S115, and the downcount timer tmINGFIR is started (step S113). Thereafter, both an integral term IIGFIR and a retard correction term IGFPI in the feedback control are set to their preceding values IIGFIR(n−1) and IGFPI(n−1) (step S114) and the process ends.

If the shift position has not been changed in step S112, it is determined whether or not the value of the timer tmINGFIR started in step S113 is "0" (step S115). If tmINGFIR is greater than 0, the process proceeds to step S114. If tmINGFIR is "0", it is determined whether or not the shift position SFT is in the drive range D or the reverse range R (in-gear condition) (step S116). If the automatic transmission is not in the in-gear condition, a FIRE mode target rotational speed NEFIR is calculated in accordance with Eq. (12) (step S117), and the process proceeds to step S121.

$$NEFIR=NOBJ+ENEFIR \qquad (12)$$

NOBJ is the target rotational speed at idling in a normal mode (other than the FIRE mode), and ENEFIR is the target rotational speed addition value calculated in step S111.

If the shift position SFT is in the drive range D or the reverse range R, i.e., the automatic transmission is in the in-gear condition in step S116, the FIRE mode target rotational speed NEFIR is calculated in accordance with Eq. (13) (step S118).

$$NEFIR=NOBJ+ENEFIR-DNEFIRDR \qquad (13)$$

DNEFIRDR is an in-gear condition correction value set to 300 rpm, for example.

In step S119, it is determined whether or not the FIRE mode target rotational speed NEFIR is less than or equal to a lower limit NEIGFIRL (e.g., 730 rpm). If NEFIR is greater than NEIGFIRL, the process proceeds directly to step S121. If NEFIR is less than or equal to NEIGFIRL, the target rotational speed NEFIR is set to the lower limit NEIGFIRL (step S120), and the process next proceeds to step S121.

Figure 15:
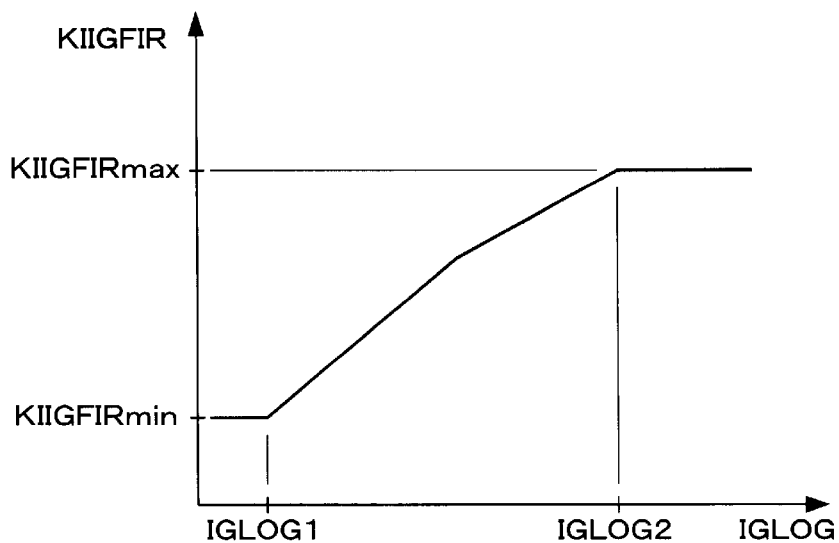
FIG. 15 is a graph showing a table used in the process shown in FIG. 13.

In step S121, a KIIGFIR table shown in FIG. 15 is retrieved according to the ignition timing IGLOG to calculate an integral term gain KIIGFIR. The KIIGFIR table is set so that the integral term gain KIIGFIR increases with an increase (advance) in the ignition timing IGLOG. In FIG. 15, KIIGFIRmax and KIIGFIRmin are set to 0.063 and 0.016, respectively, for example, and IGLOG1 and IGLOG2 are set to −10 deg and 12 deg, respectively, for example.

In step S122, the engine rotational speed NE, the FIRE mode target rotational speed NEFIR, and the integral term gain KIIGFIR are applied to Eq. (14) to calculate an addition value IIGFTMP.

$$IIGFTMP=KIIGFIR \times (NEFIR-NE) \qquad (14)$$

In step S123, the addition value IIGFTMP is added to the preceding value IIGFIR(n−1) of the integral term to calculate the integral term (present value) IIGFIR.

In steps S124 to S127 shown in FIG. 14, a limit process for the integral term IIGFIR is performed. More specifically, if the integral term IIGFIR is in the range from a predetermined lower limit IGFIRPIL to a predetermined upper limit IGFIRPIH (steps S124 and S125), the process proceeds to step S128. If the integral term IIGFIR is less than the predetermined lower limit IGFIRPIL, the integral term IIGFIR is set to the predetermined lower limit IGFIRPIL (steps S124 and S126), and the process proceeds to step S128. If the integral term IIGFIR is greater than the predetermined upper limit IGFIRPIH, the integral term IIGFIR is set to the predetermined upper limit IGFIRPIH (steps S125 and S127), and the process proceeds to step S128.

In step S128, a proportional term PIGFIR is calculated in accordance with Eq. (15). In Eq. (15), KPIGFIR is a proportional term gain which is set to a predetermined value.

$$PIGFIR=KPIGFIR \times (NEFIR-NE) \qquad (15)$$

Thereafter, the integral term IIGFIR and the proportional term PIGFIR are added to calculate a retard correction term IGFPI (step S129), and the retard correction term IGFPI is subjected to the limit process (steps S130 to S133). More specifically, if the retard correction term IGFPI is in the range from a predetermined lower limit IGFIRPIL to a predetermined upper limit IGFIRPIH (steps S130 and S131), the process ends. If the retard correction term IGFPI is less than the predetermined lower limit IGFIRPIL, the retard correction term IGFPI is set to the predetermined lower limit IGFIRPIL (steps S130 and S132), and the process ends. If the retard correction term IGFPI is greater than the predetermined upper limit IGFIRPIH, the retard correction term IGFPI is set to the predetermined upper limit (steps S131 and S133), and the process ends.

By the process of FIGS. 13 and 14, the feedback control is executed to calculate the retard correction term IGFIR so that the engine rotational speed NE coincides with the FIRE mode target rotational speed NEFIR.

Figure 16:
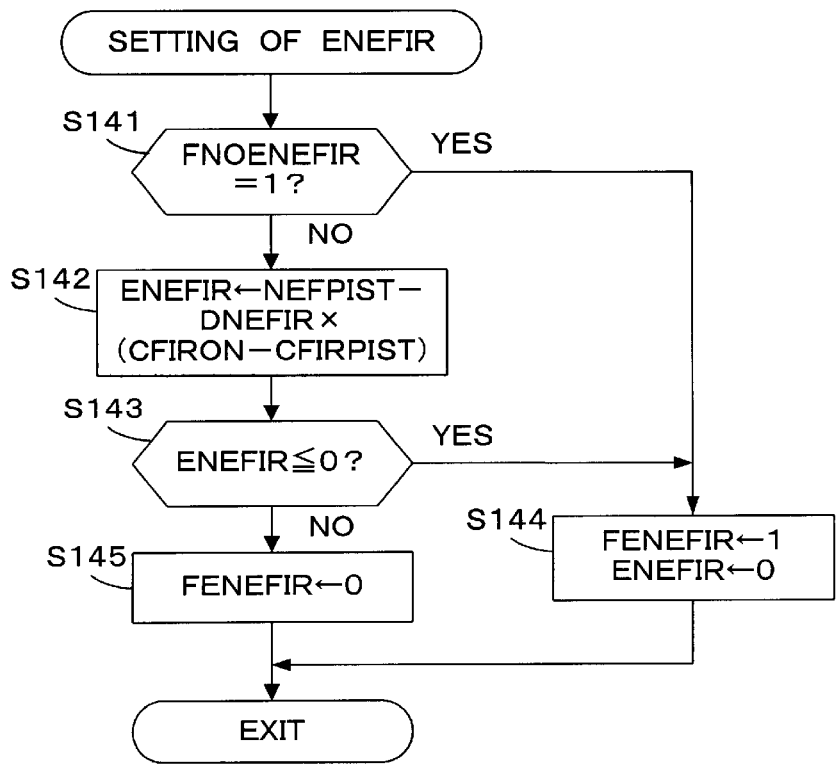
FIG. 16 is a flowchart showing a process for setting an addition value (ENEFIR) for a target engine rotational speed in the catalyst temperature rise acceleration control.

FIG. 16 is a flowchart showing the process of setting ENEFIR executed in step S111 shown in FIG. 13. In step S141, it is determined whether or not the target rotational speed flag FNOENEFIR is "1". If FNOENEFIR is "1", which indicates that the target rotational speed is not to be increased, the rotational speed addition flag FENEFIR is set to "1" and the target rotational speed addition value ENEFIR is set to "0" (step S144), and the process ends.

If FNOENEFIR is "0", the addition value ENEFIR is calculated in accordance with Eq. (16) (step S142).

$$ENEFIR=NEFPIST-DNEFIR \times (CFIRON-CFIRPIST) \qquad (16)$$

NEFPIST and DNEFIR are the addition value for the feedback control start determination and the addition value for the target rotational speed correction. The addition values NEFPIST and DNEFIR are both set in step S96 or S97 shown in FIG. 12. CFIRON is the value of the FIRE mode on counter; and CFIRPIST is the storage value stored in step S102 shown in FIG. 12. That is, (CFIRON−CFIRPIST) is a count value corresponding to the elapsed time after starting of the feedback control. Accordingly, the FIRE mode target rotational speed NEFIR is set so that NEFIR becomes equal to (NOBJ+NEFPIST) in the initial stage of the feedback control and that NEFIR gradually decreases with elapsed time until finally reaching the normal target rotational speed NOBJ according to Eq. (16) and Eq. (12) or (13) (see FIG. 17C).

In step S143, it is determined whether or not the addition value ENEFIR is less than or equal to "0". If ENEFIR is less than or equal to "0", the process proceeds to step S144. If ENEFIR is greater than "0", the rotational speed addition flag FENEFIR is set to "0" (step S145), and the process ends at once.

Figures 17A, 17B, 17C:
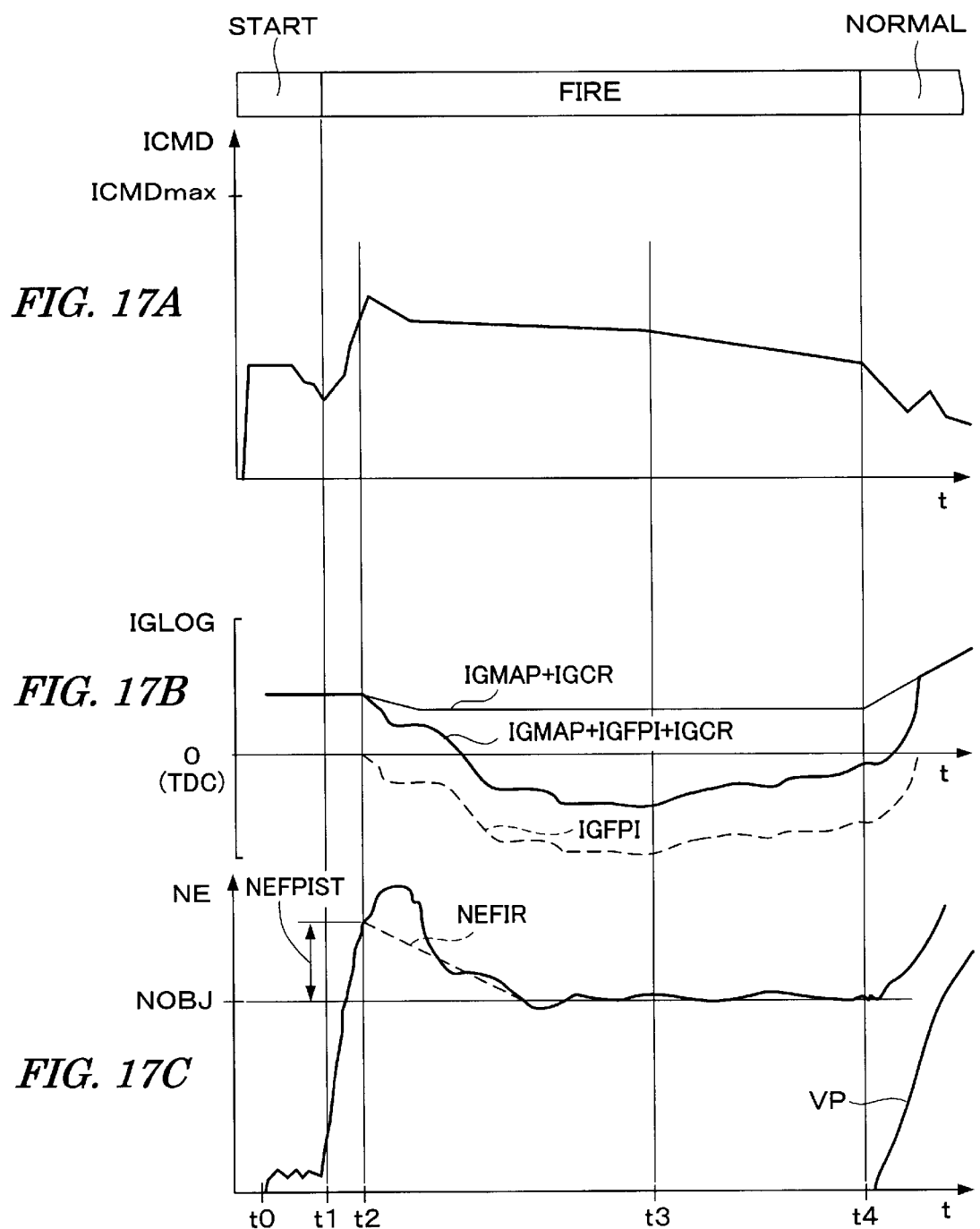
FIGS. 17A to 17C are time charts for illustrating the operation in executing the catalyst temperature rise acceleration control according to the preferred embodiment.

FIGS. 17A, 17B, and 17C are time charts for illustrating the intake air amount control and the ignition timing control mentioned above. More specifically, FIG. 17A shows changes in the valve opening control amount ICMD of the auxiliary air control valve 18. FIG. 17B shows changes in the ignition timing IGLOG. FIG. 17C shows changes in the engine rotational speed NE.

In the example shown in FIGS. 17A to 17C, the engine 1 is started at time t0 (i.e., cranking is started at the time t0), and the engine 1 starts running (a self sustaining operation) at time t1. At time t1, the FIRE mode is started. After starting the FIRE mode, the engine rotational speed NE is increased, and the execution condition of the feedback control of ignition timing is satisfied at time t2. Consequently, the feedback control is started. As mentioned above, the FIRE mode target rotational speed NEFIR is equal to (NOBJ+NEFPIST) at the beginning of the FIRE mode, and is thereafter gradually decreased down to the target rotational speed NOBJ for the normal control.

The valve opening control amount ICMD is controlled so that it is gradually increased after starting the FIRE mode and then decreased. When the pressure difference MPGA between the brake booster pressure PBB and the atmospheric pressure PA becomes lower than the predetermined pressure MPFIR at time t3, the valve opening control amount ICMD is gradually decreased in order to decrease the intake pressure. Immediately after the FIRE mode ends at time t4, the transient control is performed to gradually decrease the valve opening control amount ICMD.

The retard correction term IGFPI changes as shown by a broken line in FIG. 17B, and the ignition timing IGLOG is controlled to be retarded from the normal control value (IGMAP+IGCR). When the gradual decrease in the valve opening control amount ICMD is started at time t3, the retard correction term IGFPI is increased (the retard amount is decreased), so as to maintain the engine rotational speed NE at the target rotational speed NEFIR (=NOBJ). After time t4, the ignition timing IGLOG is controlled to gradually approach the normal control value.

During the time period between t2 and t4, the engine rotational speed NE is controlled so as to coincide with the target rotational speed NEFIR by the feedback control. In the example shown FIGS. 17A to 17C, the vehicle is started immediately after time t4, and the vehicle speed VP is gradually increased.

As described above, when the brake booster pressure PBB becomes high, the valve opening control amount ICMD of the auxiliary air control valve 18 is gradually decreased (as a result, the ignition timing is gradually advanced), thereby suppressing the catalyst temperature rise acceleration control. Accordingly, the absolute intake pressure PBA can be decreased and the brake booster pressure PBB can therefore be decreased, so that the braking force by the brake booster 32 can be prevented from becoming too small.

In this preferred embodiment, the auxiliary air passage 17 and the auxiliary air control valve 18 constitute a part of the intake air amount control means, and the ECU 5 constitutes a part of the intake air amount control means, the ignition timing control means, the catalyst temperature raising means, and the catalyst temperature rise control suppressing means. More specifically, the processes of FIGS. 2, 3, 5, 7, 8, and 9 correspond to the intake air amount control means. The processes of FIGS. 11, 12, 13, 14, and 16 correspond to the ignition timing control means. Step S163 and the following steps after step S163 shown in FIG. 7 and the process of FIG. 13 correspond to the catalyst temperature raising means. Steps S161 and S162 shown in FIG. 7 correspond to the catalyst temperature rise control suppressing means.

Further, the auxiliary air passage 17 and the auxiliary air control valve 18 constitute a part of an intake air amount control module, and the ECU 5 constitutes a part of an intake air amount control module, an ignition timing control module, a catalyst temperature raising module, and a catalyst temperature rise control suppressing module. More specifically, the processes of FIGS. 2, 3, 5, 7, 8, and 9 correspond to the intake air amount control module. The processes of FIGS. 11, 12, 13, 14, and 16 correspond to the ignition timing control module. Step S163 and the following steps after step S163 shown in FIG. 7 and the process of FIG. 13 correspond to the catalyst temperature raising module. Steps S161 and S162 shown in FIG. 7 correspond to the catalyst temperature rise control suppressing module.

The present invention is not limited to the above preferred embodiment, but various modifications may be made. For example, in the above-described embodiment, step S162 shown in FIG. 7 is executed to gradually decrease the intake air amount when the pressure difference MPGA between the brake booster pressure PBB and the atmospheric pressure PA is less than or equal to the predetermined pressure MPFIR, step S162 may be executed when the pressure difference PBG (=PA−PBA) between the absolute intake pressure PBA and the atmospheric pressure PA is less than or equal to the predetermined pressure MPFIR.

Further, the intake air amount is increased by the auxiliary air passage 17 and the auxiliary air control valve 18 in the above preferred embodiment. A so-called DBW (Drive By Wire) type throttle valve may be adopted and the valve opening of the throttle valve may be directly controlled to thereby increase the intake air amount.

What is claimed is:

1. A control system for an internal combustion engine having an intake system and an exhaust system, said exhaust system including a catalyst, said intake system including a throttle valve, said engine being mounted on a vehicle having a brake booster to which an intake pressure at downstream of said throttle valve is introduced, said control system comprising:

intake air amount control means for controlling an intake air amount of said engine;

ignition timing control means for controlling an ignition timing of said engine;

catalyst temperature raising means for increasing the intake air amount after starting of said engine and retarding the ignition timing according to a rotational speed of said engine;

intake pressure detecting means for detecting the intake pressure at downstream of said throttle valve; and catalyst temperature rise control suppressing means for gradually suppressing the operation of said catalyst temperature raising means when a pressure difference between the detected intake pressure and the atmospheric pressure during the operation of said catalyst temperature raising means is less than a predetermined pressure.

2. A control system according to claim 1, wherein said catalyst temperature rise control suppressing means gradually decreases the increased intake air amount and gradually decreases the retard amount of the ignition timing.

3. A control system according to claim 1, wherein said catalyst temperature raising means operates when the rotational speed of said engine is greater than or equal to a predetermined lower limit and said engine is in an idling condition.

4. A control system according to claim 1, further comprising coolant temperature detecting means for detecting a coolant temperature of said engine, wherein an operating time period of said catalyst temperature raising means is set according to the coolant temperature detected at starting of said engine.

5. A control system according to claim 1, wherein said catalyst temperature raising means sets the retard amount of the ignition timing so that the rotational speed of said engine becomes equal to a target rotational speed.

6. A control system for an internal combustion engine having an intake system and an exhaust system, said exhaust system including a catalyst, said intake system including a throttle valve, said engine being mounted on a vehicle having a brake booster to which an intake pressure at downstream of said throttle valve is introduced, said control system comprising:
   intake air amount control means for controlling an intake air amount of said engine;
   ignition timing control means for controlling an ignition timing of said engine;
   catalyst temperature raising means for increasing the intake air amount after starting of said engine and retarding the ignition timing according to a rotational speed of said engine;
   brake booster pressure detecting means for detecting a pressure in said brake booster; and
   catalyst temperature rise control suppressing means for gradually suppressing the operation of said catalyst temperature raising means when a pressure difference between the pressure detected by said brake booster pressure detecting means and the atmospheric pressure during the operation of said catalyst temperature raising means is less than a predetermined pressure.

7. A control system according to claim 6, wherein said catalyst temperature rise control suppressing means gradually decreases the increased intake air amount and gradually decreases the retard amount of the ignition timing.

8. A control system according to claim 6, wherein said catalyst temperature raising means operates when the rotational speed of said engine is greater than or equal to a predetermined lower limit and said engine is in an idling condition.

9. A control system according to claim 6, further comprising coolant temperature detecting means for detecting a coolant temperature of said engine, wherein an operating time period of said catalyst temperature raising means is set according to the coolant temperature detected at starting of said engine.

10. A control system according to claim 6, wherein said catalyst temperature raising means sets the retard amount of the ignition timing so that the rotational speed of said engine becomes equal to a target rotational speed.

11. A control method for an internal combustion engine having an intake system and an exhaust system, said exhaust system including a catalyst, said intake system including a throttle valve, said engine being mounted on a vehicle having a brake booster to which an intake pressure at downstream of said throttle valve is introduced, said control method comprising the steps of:
   a) executing a catalyst temperature raising control in which the intake air amount after starting of said engine is increased and the ignition timing is retarded according to a rotational speed of said engine;
   b) detecting the intake pressure at downstream of said throttle valve; and
   c) gradually suppressing the catalyst temperature raising control when a pressure difference between the detected intake pressure and the atmospheric pressure during the execution of the catalyst temperature raising control is less than a predetermined pressure.

12. A control method according to claim 11, wherein the increased intake air amount and the retard amount of the ignition timing is gradually decreased in said step c).

13. A control method according to claim 11, wherein the catalyst temperature raising control is executed when the rotational speed of said engine is greater than or equal to a predetermined lower limit and said engine is in an idling condition.

14. A control method according to claim 11, further comprising the step of detecting a coolant temperature of said engine, wherein an execution time period of the catalyst temperature raising control is set according to the coolant temperature detected at starting of said engine.

15. A control method according to claim 11, wherein the retard amount of the ignition timing is set so that the rotational speed of said engine becomes equal to a target rotational speed.

16. A control method for an internal combustion engine having an intake system and an exhaust system, said exhaust system including a catalyst, said intake system including a throttle valve, said engine being mounted on a vehicle having a brake booster to which an intake pressure at downstream of said throttle valve is introduced, said control method comprising the steps of:
   a) executing a catalyst temperature raising control in which the intake air amount is increased after starting of said engine and the ignition timing is retarded according to a rotational speed of said engine;
   b) detecting a pressure in said brake booster; and
   c) gradually suppressing the catalyst temperature raising control when a pressure difference between the detected pressure in said brake booster and the atmospheric pressure during the execution of the catalyst temperature raising control is less than a predetermined pressure.

17. A control method according to claim 16, wherein the increased intake air amount and the retard amount of the ignition timing is gradually decreased in said step c).

18. A control method according to claim 16, wherein the catalyst temperature raising control is executed when the rotational speed of said engine is greater than or equal to a predetermined lower limit and said engine is in an idling condition.

19. A control method according to claim 16, further comprising the step of detecting a coolant temperature of said engine, wherein an execution time period of the catalyst temperature raising control is set according to the coolant temperature detected at starting of said engine.

20. A control method according to claim 16, wherein the retard amount of the ignition timing is set so that the rotational speed of said engine becomes equal to a target rotational speed.

21. A control system for an internal combustion engine having an intake system and an exhaust system, said exhaust system including a catalyst, said intake system including a throttle valve, said engine being mounted on a vehicle having a brake booster to which an intake pressure at downstream of said throttle valve is introduced, said control system comprising:

an intake air amount control module for controlling an intake air amount of said engine;

an ignition timing control module for controlling an ignition timing of said engine;

a catalyst temperature raising module for increasing the intake air amount after starting of said engine and retarding the ignition timing according to a rotational speed of said engine;

an intake pressure sensor for detecting the intake pressure at downstream of said throttle valve; and a catalyst temperature rise control suppressing module for gradually suppressing the operation of said catalyst temperature raising module when a pressure difference between the detected intake pressure and the atmospheric pressure during the operation of said catalyst temperature raising module is less than a predetermined pressure.

22. A control system according to claim 21, wherein said catalyst temperature rise control suppressing module gradually decreases the increased intake air amount and gradually decreases the retard amount of the ignition timing.

23. A control system according to claim 21, wherein said catalyst temperature raising module operates when the rotational speed of said engine is greater than or equal to a predetermined lower limit and said engine is in an idling condition.

24. A control system according to claim 21, further comprising a coolant temperature sensor for detecting a coolant temperature of said engine, wherein an operating time period of said catalyst temperature raising module is set according to the coolant temperature detected at starting of said engine.

25. A control system according to claim 21, wherein said catalyst temperature raising module sets the retard amount of the ignition timing so that the rotational speed of said engine becomes equal to a target rotational speed.

26. A control system for an internal combustion engine having an intake system and an exhaust system, said exhaust system including a catalyst, said intake system including a throttle valve, said engine being mounted on a vehicle having a brake booster to which an intake pressure at downstream of said throttle valve is introduced, said control system comprising:

an intake air amount control module for controlling an intake air amount of said engine;

an ignition timing control module for controlling an ignition timing of said engine;

a catalyst temperature raising module for increasing the intake air amount after starting of said engine and retarding the ignition timing according to a rotational speed of said engine;

a brake booster pressure sensor for detecting a pressure in said brake booster; and a catalyst temperature rise control suppressing module for gradually suppressing the operation of said catalyst temperature raising module when a pressure difference between the pressure detected by said brake booster pressure sensor and the atmospheric pressure during the operation of said catalyst temperature raising module is less than a predetermined pressure.

27. A control system according to claim 26, wherein said catalyst temperature rise control suppressing module gradually decreases the increased intake air amount and gradually decreases the retard amount of the ignition timing.

28. A control system according to claim 26, wherein said catalyst temperature raising module operates when the rotational speed of said engine is greater than or equal to a predetermined lower limit and said engine is in an idling condition.

29. A control system according to claim 26, further comprising a coolant temperature sensor for detecting a coolant temperature of said engine, wherein an operating time period of said catalyst temperature raising module is set according to the coolant temperature detected at starting of said engine.

30. A control system according to claim 26, wherein said catalyst temperature raising module sets the retard amount of the ignition timing so that the rotational speed of said engine becomes equal to a target rotational speed.

\* \* \* \* \*